US012467294B2

(12) United States Patent
Schmutter

(10) Patent No.: US 12,467,294 B2
(45) Date of Patent: Nov. 11, 2025

(54) DOOR HARDWARE AND FLOOR STRIKE INSTALLATION TOOLS FOR A PORTABLE DOOR SHELTER LOCK

(71) Applicant: Bruce Schmutter, Long Island City, NY (US)

(72) Inventor: Bruce Schmutter, Long Island City, NY (US)

(*) Notice: Subject to any disclaimer, the term of this patent is extended or adjusted under 35 U.S.C. 154(b) by 0 days.

(21) Appl. No.: 19/061,096

(22) Filed: Feb. 24, 2025

(65) Prior Publication Data

US 2025/0188775 A1 Jun. 12, 2025

Related U.S. Application Data

(63) Continuation-in-part of application No. 19/016,460, filed on Jan. 10, 2025, which is a continuation of (Continued)

(51) Int. Cl.
*B23P 11/00* (2006.01)
*E05B 17/06* (2006.01)
(Continued)

(52) U.S. Cl.
CPC ............ *E05C 19/005* (2013.01); *E05B 17/06* (2013.01); *E05B 53/001* (2013.01); *E05C 19/188* (2013.01)

(58) Field of Classification Search
CPC ...... E05C 19/005; E05C 19/188; E05C 1/006; E05C 1/163; E05B 17/06; E05B 53/001
See application file for complete search history.

(56) References Cited

U.S. PATENT DOCUMENTS 49,269 A 8/1865 Parker
361,693 A 4/1887 Guild
(Continued)

FOREIGN PATENT DOCUMENTS

CN 107939192 A 4/2018
CN 209419020 U 9/2019
(Continued)

OTHER PUBLICATIONS

"How to Choose the Perfect Door Lock", Latham's Hardware, @2024, retrieved on Jul. 18, 2024 from https://www.lathamshardware.co.uk/blog/how-to-guides/how-to-choose-the-perfect-door-lock/.
(Continued)

*Primary Examiner* — Jun S Yoo
(74) *Attorney, Agent, or Firm* — Caesar Rivise, PC

(57) ABSTRACT

A first installation tool (FIT) for defining the precise location of door hardware on a door that receives a portable locking device (PLD) therein and a second installation tool (SIT) for forming a floor strike at a precise floor location that the PLD interacts with when installed in the door hardware. The FIT includes a pair of adjustable vertically-oriented panels with apertures therein, and a vertically-adjustable base, for releasably securing to the bottom of the door to define and guide a drill to form door apertures for securing the door hardware thereto. The SIT includes a drill, mounted vertically on a base that can be precisely moved horizontally. The SIT includes a coupling assembly that releasably engages with the door apertures. When activated, the drill drills down vertically to remove floor material and is incrementally moved horizontally to forms a precise well in the floor to form the floor strike.

10 Claims, 29 Drawing Sheets

Related U.S. Application Data application No. 18/777,125, filed on Jul. 18, 2024, now Pat. No. 12,227,975.

(60) Provisional application No. 63/557,670, filed on Feb. 26, 2024, provisional application No. 63/528,503, filed on Jul. 24, 2023.

(51) Int. Cl.

| | |
|---|---|
| ***E05B 53/00*** | (2006.01) |
| ***E05C 19/00*** | (2006.01) |
| ***E05C 19/18*** | (2006.01) |

(56) References Cited

U.S. PATENT DOCUMENTS

| | | | | |
|---|---|---|---|---|
| 459,676 | A | 9/1891 | Daniel | |
| 475,368 | A | 5/1892 | Welch | |
| 618,818 | A | 2/1899 | Adams | |
| 670,854 | A | 3/1901 | Deibel | |
| 922,083 | A | 5/1909 | Campbell | |
| 982,136 | A | 1/1911 | Hanson | |
| 1,057,995 | A | 4/1913 | Bull | |
| 1,654,221 | A | 12/1927 | Kline | |
| 3,239,261 | A | 3/1966 | Bryson et al. | |
| 3,989,286 | A | 11/1976 | Cleff | |
| 5,525,963 | A | 6/1996 | Purssey | |
| 5,664,812 | A | 9/1997 | Marinoni | |
| 6,629,713 | B1 | 10/2003 | Duffy et al. | |
| 7,965,178 | B1 | 6/2011 | Schmuttor et al. | |
| 9,435,147 | B1 | 9/2016 | Giandomenico et al. | |
| 9,871,399 | B2 | 1/2018 | Mittleman et al. | |
| 10,174,532 | B2 | 1/2019 | Couturier | |
| 10,614,687 | B2 | 4/2020 | Rehfeld et al. | |
| 11,649,661 | B2 | 5/2023 | Fischer | |
| 12,227,975 | B1 | 2/2025 | Schmutter | |
| 2007/0086866 | A1 * | 4/2007 | Shute | B23B 47/287<br>408/1 R |
| 2011/0291426 | A1 | 12/2011 | Gibson | |
| 2014/0064867 | A1 * | 3/2014 | Trettin | B23B 49/02<br>408/115 B |
| 2014/0265363 | A1 * | 9/2014 | Mock | E05B 53/001<br>292/177 |
| 2014/0366395 | A1 | 12/2014 | Ward | |
| 2020/0071960 | A1 | 3/2020 | Wadlow | |
| 2020/0141153 | A1 * | 5/2020 | Sawa | E05B 17/06 |

FOREIGN PATENT DOCUMENTS

| | | | |
|---|---|---|---|
| CN | 113638574 | A | 11/2021 |
| GB | 2359335 | A | 8/2001 |
| JP | H11323840 | A | 11/1999 |
| KR | 200410054 | Y1 | 3/2006 |
| WO | WO2017/191449 | A1 | 11/2017 |

OTHER PUBLICATIONS

"What is the Safety Act?", Department of Homeland Security, Jan. 2020.

"The Anchor—Create A Safe Zone During A Crisis—The ONLY Patented Device On The Market", Anchorman, Inc., @2024, retrieved on Jul. 18, 2024 fro https://www.anchormaninc.com.

Anchorman, Inc., "Installation", Apr. 2023.

International Search Report for related PCT Application No. PCT/US2024/038730 dated Oct. 28, 2024.

International Search Report for corresponding PCT Application No. PCT/US2025/017199 dated Jun. 9, 2025.

* cited by examiner

DOOR HARDWARE AND FLOOR STRIKE INSTALLATION TOOLS FOR A PORTABLE DOOR SHELTER LOCK

CROSS-REFERENCE TO RELATED APPLICATIONS

This non-provisional application claims the benefit under 35 U.S.C. § 119(e) of Application Ser. No. 63/557,670 filed on Feb. 26, 2024 entitled DOOR HARDWARE AND FLOOR STRIKE INSTALLATION TOOL and also claims the benefit under 35 U.S.C. § 120 as a Continuation-in-Part application of application Ser. No. 19/016,460 filed on Jan. 10, 2025 which in turn is a Continuation application, and claims the benefit under 35 U.S.C. § 120, of application Ser. No. 18/777,125 (now U.S. Pat. No. 12,227,975) filed on Jul. 18, 2024 both entitled SYSTEM AND METHOD FOR SHELTERING IN PLACE WITH ADVANCED RESPONDER NOTIFICATION AND READY ACCESS which in turn claims the benefit under 35 U.S.C. § 119(e) of Application Ser. No. 63/528,503 filed on Jul. 24, 2023 entitled SYSTEM AND METHOD FOR A UNIVERSAL TAMPER-RESISTANT SHELTER-IN-PLACE BARRICADE LOCKING DEVICE and all of whose entire disclosures are incorporated by reference herein.

BACKGROUND OF THE INVENTION

This present invention relates to door lock tools, and more particularly, to specialized tools for installing hardware on a door to receive a portable door shelter lock therein, as well as for forming a floor strike to receive a portion of the portable door shelter lock therein for releasably securing the door in a locked condition.

After multiple and ongoing active shooter and workplace violence events, the need for defending/securing oneself in a particular room has significantly increased. While there are an abundant number of current ways to "close", "latch" and/or "lock" a door, it is the "how" that is of prime concern.

In U.S. Pat. No. 12,227,975 (Schmutter) entitled "System and Method for a Sheltering In Place with Advanced Responder Notification and Ready Access", whose entire disclosure is incorporated by reference herein, the inventor of the present invention disclosed a novel and inventive door shelter lock (DSL) that is installed at the bottom portion of the door and when activated by the people in the room where the door is located, the door is strongly secured against opening by a malefactor. The locking device itself is stowed in an enclosure in the room and should the people feel threatened, they can remove the DSL from the enclosure and couple it to a "door assembly" which has been previously installed on the bottom portion of the door. A floor strike (i.e., well in the floor) has also been previously formed in the floor to allow a plurality of latch pins to descend from the DSL and into the well when the DSL is activated. The invention of the present application is a specialized tool designed to install the door assembly on the door at the proper location, as well as to form the strike plate in the floor at the proper location. Without this tool, installing the door hardware and the floor strike improperly will result in the DSL not functioning properly. Thus, there remains a need for an installation tool that can address all of the foregoing. The present invention solves these problems.

All references cited herein are incorporated herein by reference in their entireties.

BRIEF SUMMARY OF THE INVENTION

An installation tool for simultaneously defining precise locations on a door where a mounting plate is to be mounted and on a floor where a corresponding floor strike must be installed is disclosed. The mounting plate is configured for receiving a door lock (e.g., a door shelter lock) therein and which comprises a plurality of mounting apertures and latch pins, wherein the latch pins are configured to be received into the floor strike to lock the door. The installation tool comprises: a pair of upright panels, each having opposite sides positioned within corresponding U-shaped braces, separated by a distance which can be adjusted such that a first one of the upright panels can be placed against an inside surface of the door and the other one of the upright panels can be placed against an outside surface of the door and the pair of upright panels are configured for being releasably tightened against the door using the adjustment member, and wherein the pair of upright panels comprises a plurality of apertures that correspond to the plurality of mounting apertures on the mounting plate, wherein the U-shaped braces are mounted on a plurality of vertical members that are adjustable in height; and a floor strike template coupled to a pair of the vertical members adjacent the first one of the upright panels, and wherein the floor strike template is configured for positioning on top of the floor and comprising and indicator that defines the precise location of the floor strike.

An installation tool for forming a well in a floor, adjacent a door, into which a floor strike is to be placed is disclosed. The door was previously configured for receiving a mounting bracket thereon to hold a door lock (e.g., a door shelter lock) therein, and wherein the door lock has latch pins that interact with the floor strike to lock the door. The installation tool comprises: a frame upon which is located a base that is adjustable along an axis that is parallel to the door when the installation tool is positioned at the door, and wherein the frame further comprises a coupling assembly for releasably coupling the installation tool to the door; a drill that is mounted to a vertical control assembly that can displace the drill in a vertical direction, and wherein the vertical control assembly is coupled to the base; and wherein the base is configured for being manually displaced along the axis and the drill is activated and displaced downward against the floor to form the well in the floor into which the floor strike is positioned.

A method for precisely defining the locations of a door lock mounting bracket on a door and a corresponding floor strike in a floor and the installation of the same such that a door lock (e.g., door shelter lock) mounted in the bracket consistently and precisely engages the floor strike is disclosed. The method comprises: (a) releasably securing a first installation tool to the door that simultaneously and mechanically aligns locations of mounting apertures in the door lock mounting bracket with a location on the floor for forming a well to receive a floor strike therein; (b) forming a plurality of apertures in the door, corresponding to the mounting apertures, using the first installation tool which comprises a pair of plates that couple to an outer door surface and an inner door surface, respectively, each plate comprising the plurality of apertures; (c) using the first installation tool to define the precise location of the well on the floor; (d) disengaging the first installation tool from the door); (e) releasably securing a second installation to the door using the plurality of apertures in the door, and wherein the second installation tool has a vertically-mounted drill that, when the second installation tool is releasably secured to the door, is fixedly positioned at a precise distance from the door corresponding to the location of the floor strike, and wherein the vertically-mounted drill is displaceable along an axis parallel to the door, and wherein the drill is also vertically-displaceable; (f) activating the drill and lowering the drill such that a drill bit drills down into the floor to form a portion of the well; (g) raising the drill and incrementally displacing the drill along the axis; (h) repeating steps (f)-(g) until the well is formed within the floor; and (i) disengaging the second installation tool.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Figure 1:
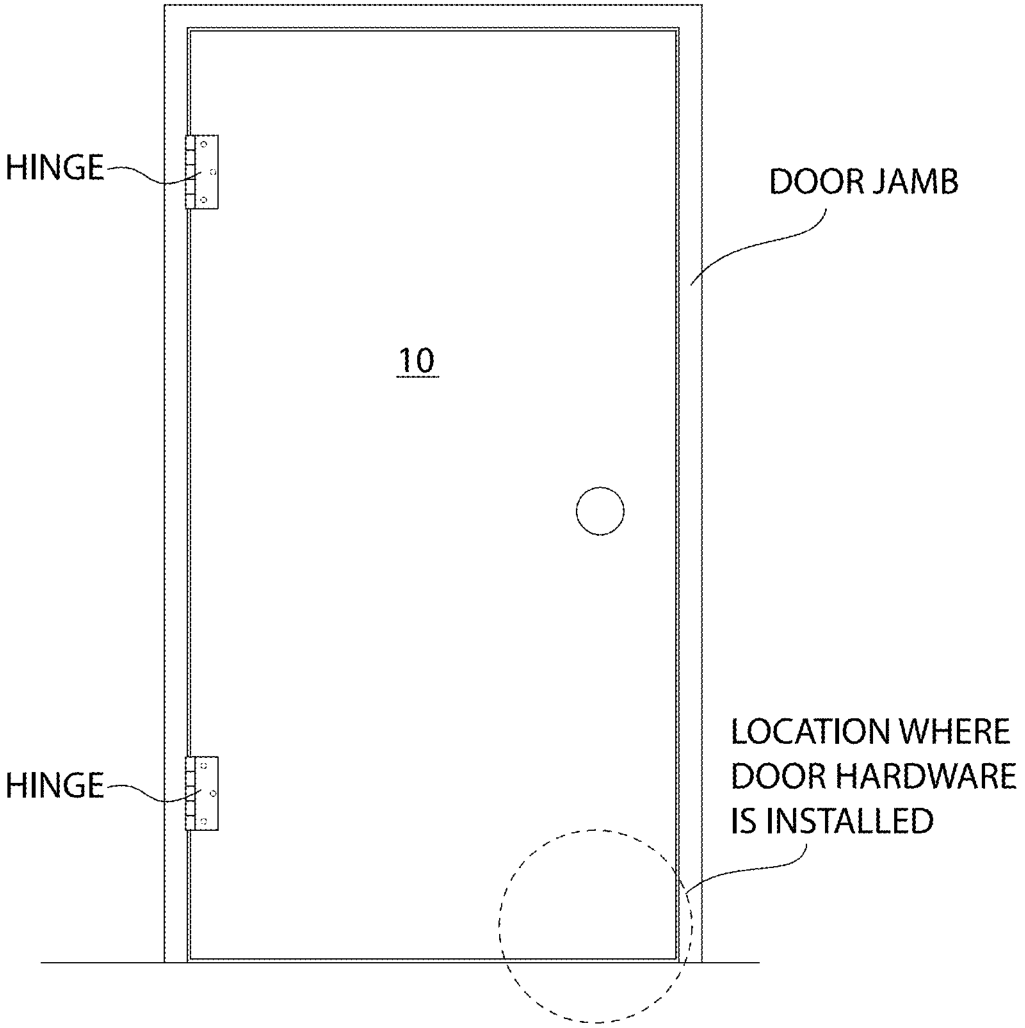
FIG. 1 shows the location on the door, on the inside-of-room door surface, where the door hardware is installed by the specialized tool of the present invention.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

Figure 8:
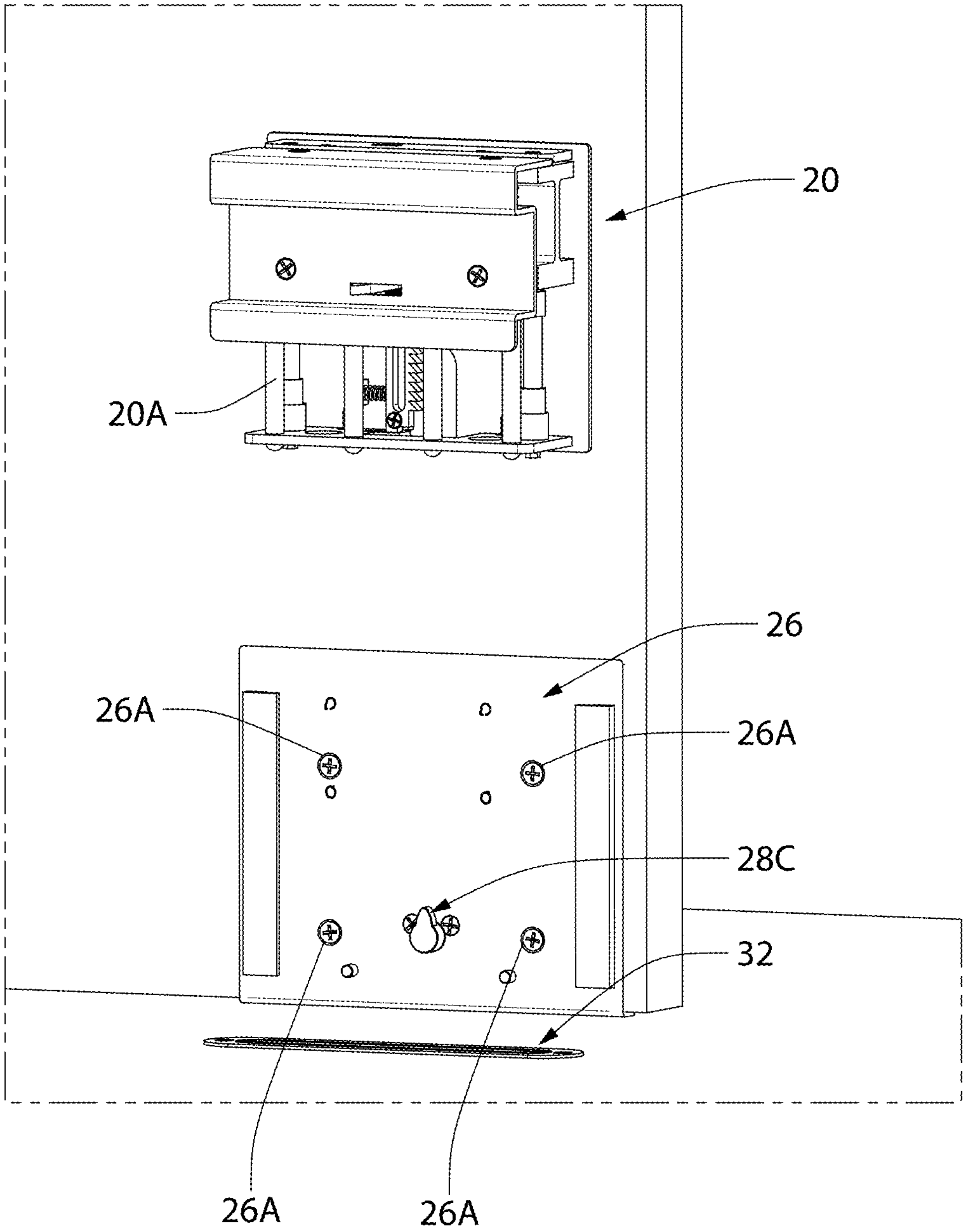
FIG. 8 depicts the DSL being installed into the return plate of the door hardware on the inside side of the door.

The door shelter lock 20 (DSL, most clearly shown in FIG. 8 and the subject of U.S. Pat. No. 12,227,975 and whose entire disclosure is incorporated by reference herein) is removably mounted to the lower portion on the inside surface of a door to a room or other enclosure. FIG. 1 shows the general area on the inside surface (i.e., the side of the door within the room or enclosure) of the door where the DSL 20 is to be installed. As can be seen most clearly in FIG. 8, the DSL 20 is about to be releasably installed into an inner door plate 26 (also referred to as a "mounting plate"). The DSL 20 has a plurality of latch pins 20A that can be positioned down into a floor strike 32 located in the floor 12 when the DSL 20 is activated by someone in the room/enclosure.

Figure 2:
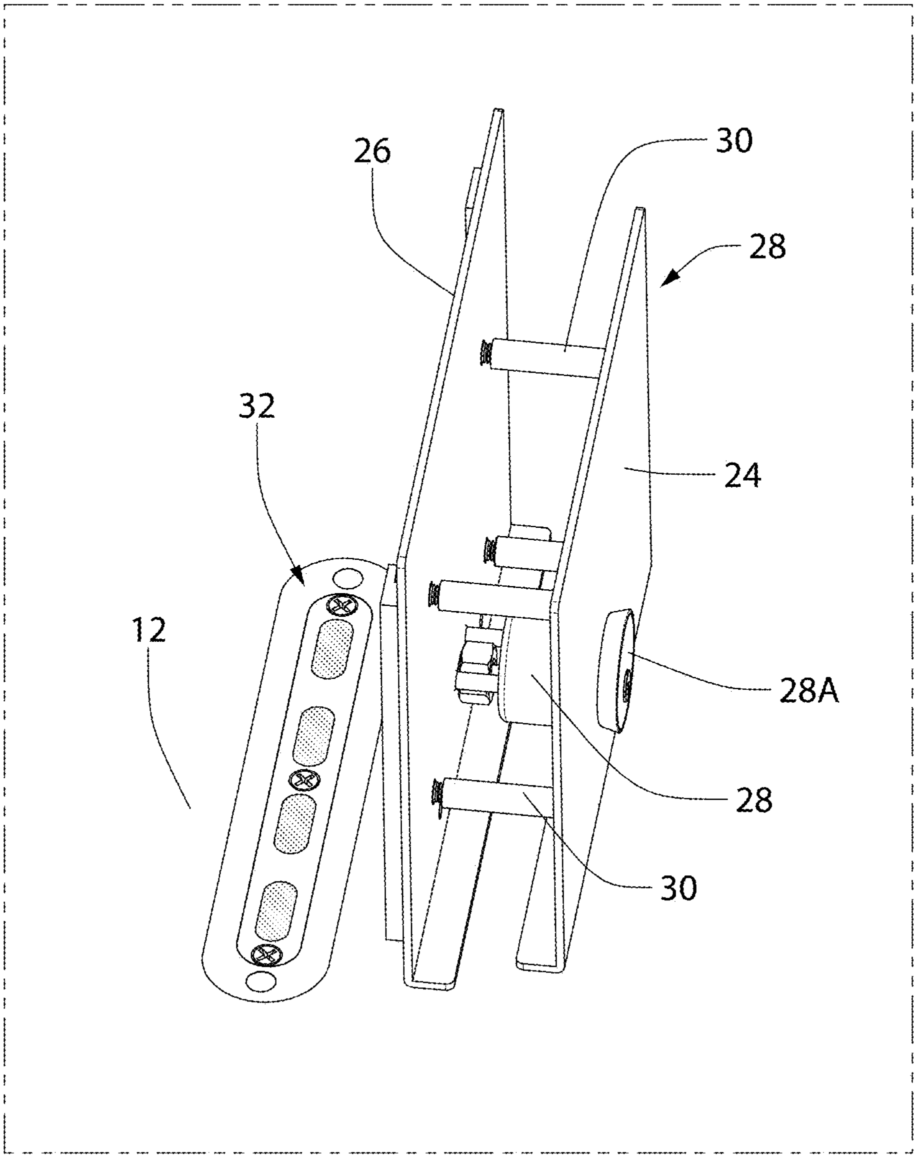
FIG. 2 depicts the door hardware (with the door itself omitted for clarity) and the corresponding location of the floor strike in the floor.
Figure 6:
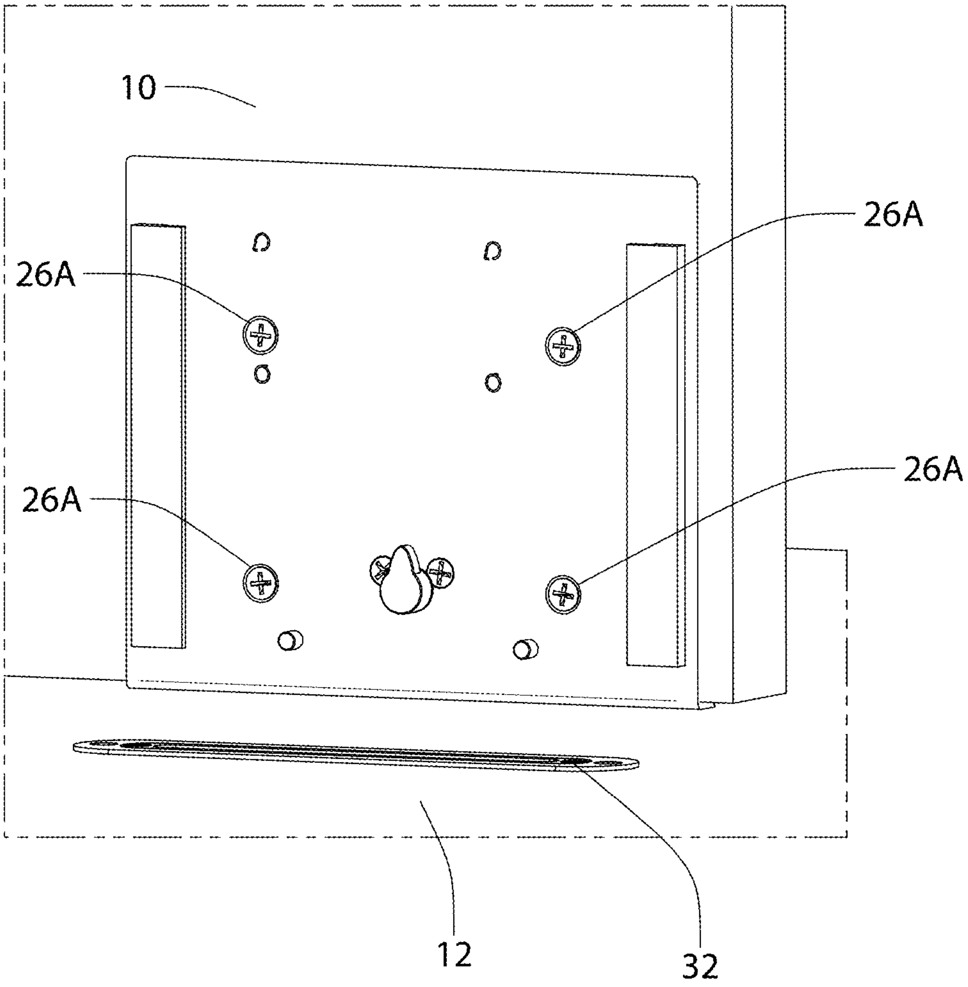
FIG. 6 depicts the return plate on the inside side of the door being aligned with holes drilled into the door using the specialized tool of the present invention.
Figure 7:
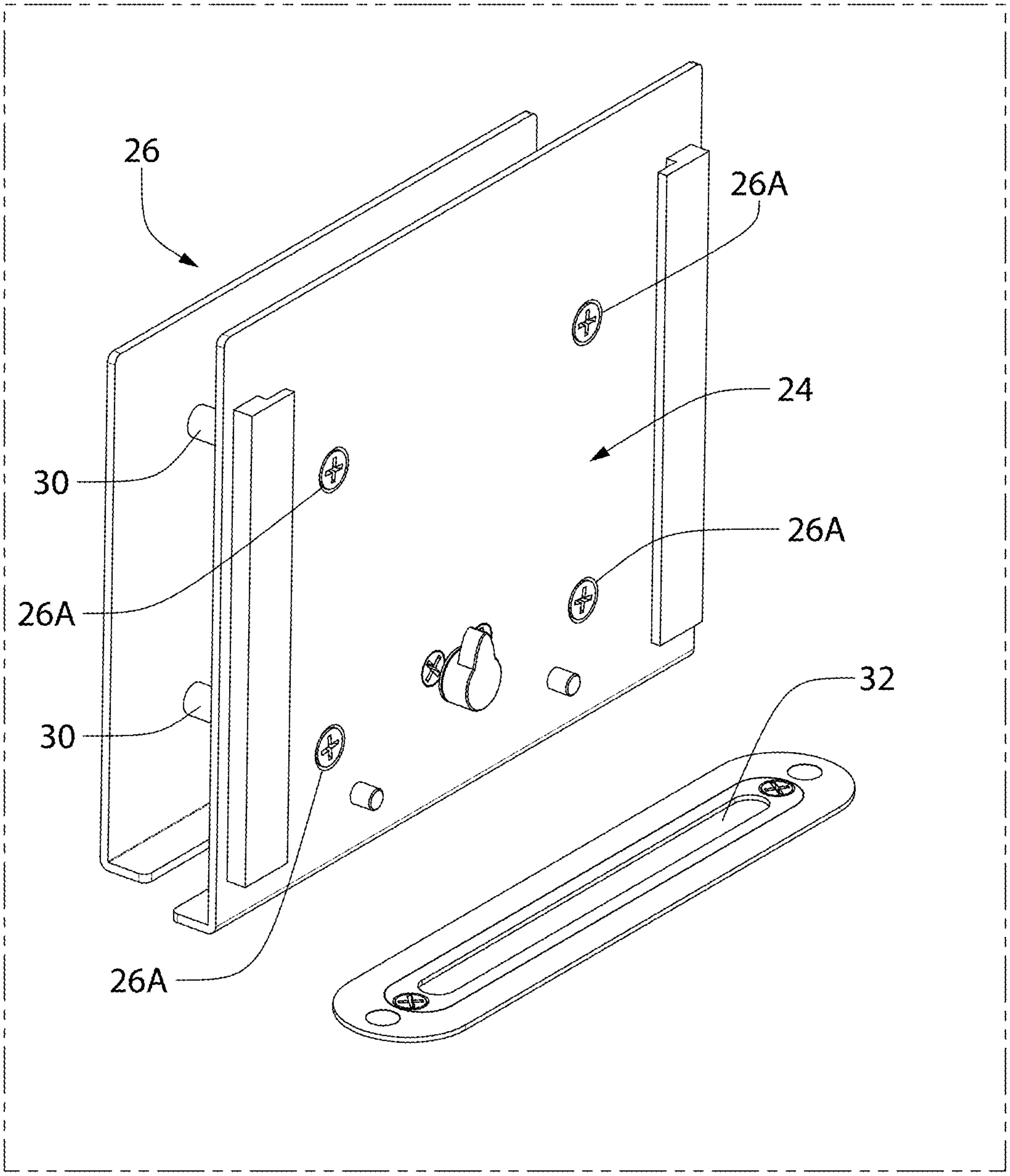
FIG. 7 depicts an isometric of the door hardware to show alignment of the return plate and the outdoor plate with the door itself omitted for clarity.

As shown most clearly in FIG. 2, the inner door plate 26 forms one portion of a door assembly 22. The door assembly 22 comprises the inner door plate 26 and an outer door plate 24 that are coupled together by studs 30, formed into the outer door plate 24, that pass through holes 16 (FIG. 5) through the door 10 and into the inner door plate 26. Fasteners (see exemplary screw heads in FIG. 6) then pass through mounting apertures 26A (FIGS. 6-8) in the inner door plate 26 and into the studs 30 and are then tightened to secure the studs 30 to the inner door plate 24. A key cylinder 28 is also installed through an aperture 18 (FIG. 5) in the door 10 such a cylinder ring 28A and a key faceplate/insertion aperture 28B are present at the outer door plate 24. On the other end of the key cylinder 28 is a cam 28C (FIG. 8) that operates with the DSL 20 when it is installed and a key (not shown) is inserted in the key faceplate/insertion aperture 28B. Only first responders have a corresponding key (the "1620 key") that can be inserted into the aperture 28B to unlock the DSL 20 from the outside of the door 10.

Figure 3:
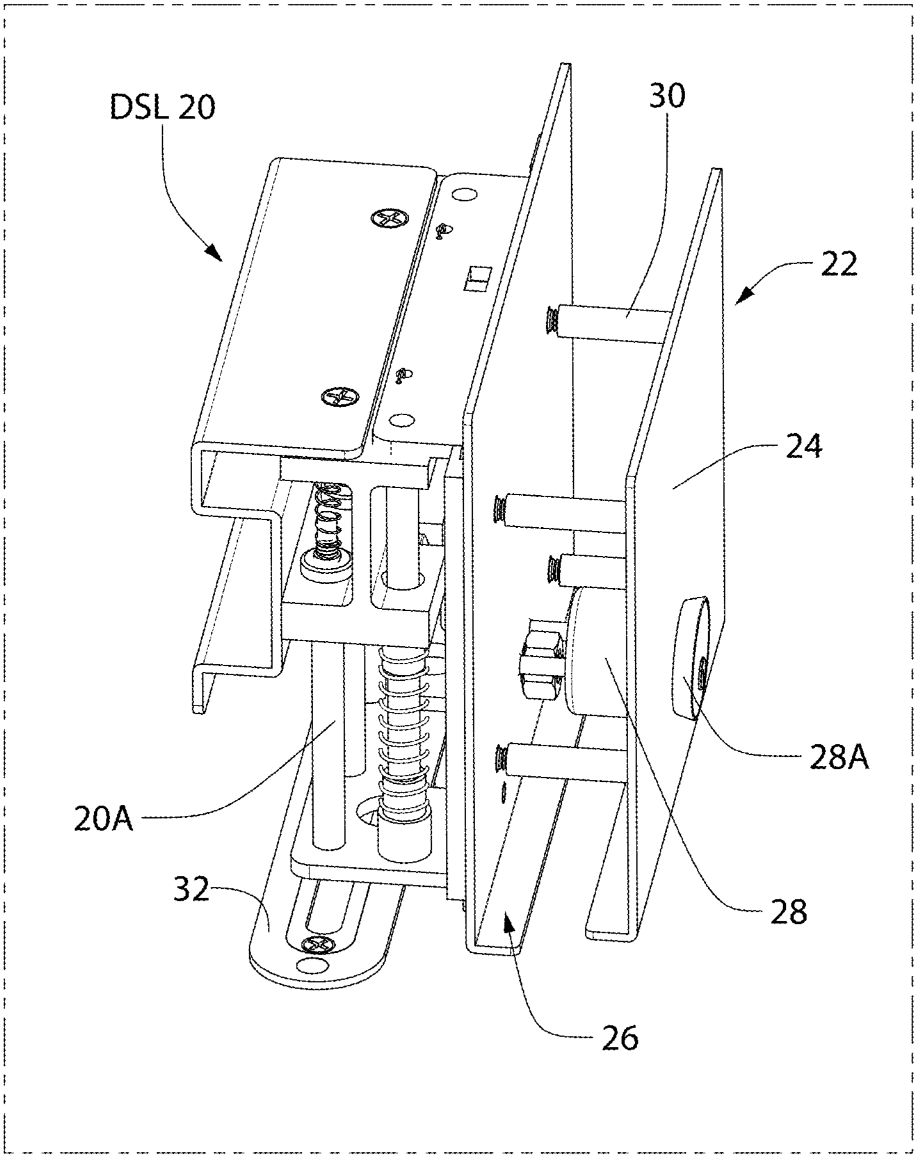
FIG. 3 depicts the door shelter lock (DSL) installed on the return plate of the door hardware on the inside (room side) side of the door, with the outdoor plate shown with key mechanism, and again the door is omitted in this view.
Figure 4:
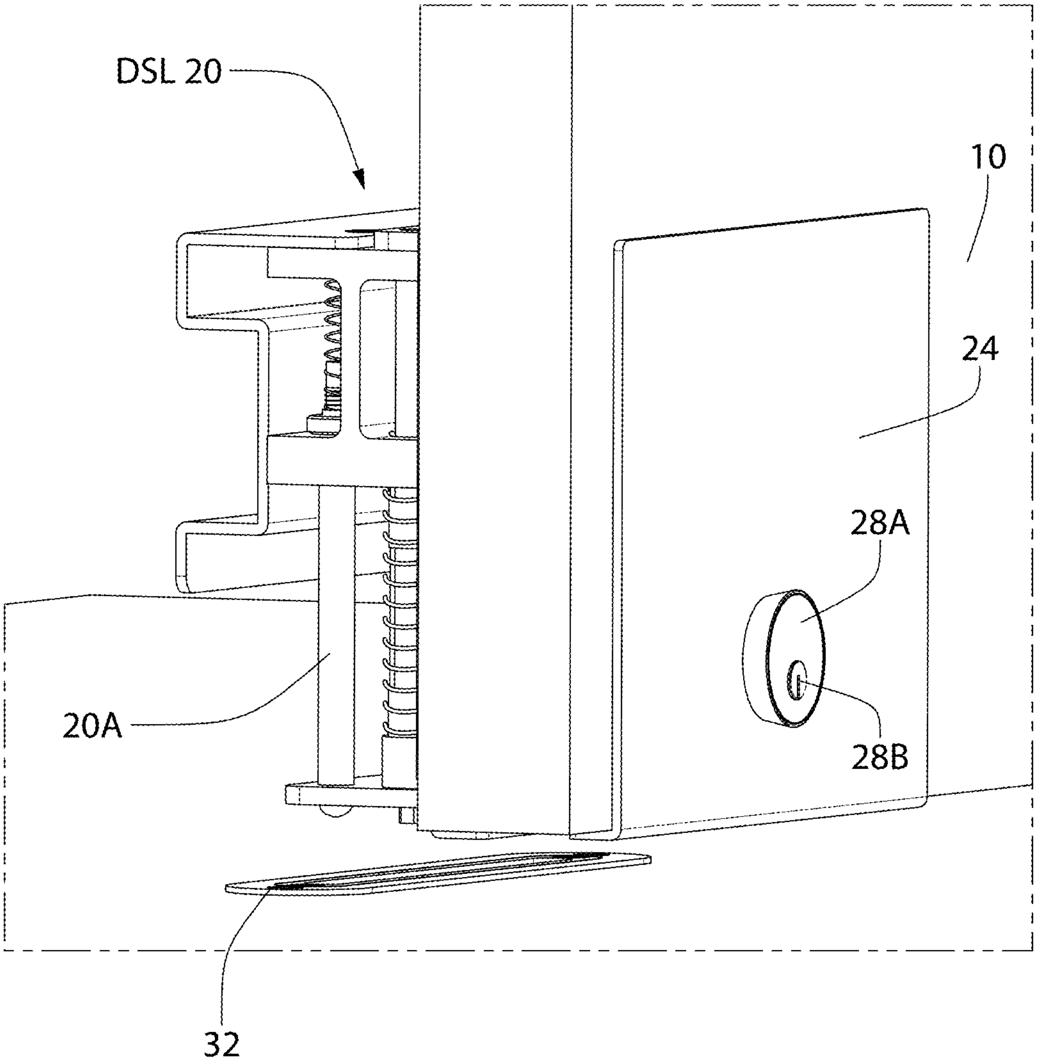
FIG. 4 is a partial isometric view showing the door hardware and the DSL installed on the inside of the door while the outdoor plate and key mechanism is shown on the outdoor plate on the outside side of the door.

The floor strike 32 (FIGS. 2-4) is installed in a corresponding well 14 (FIG. 5) that is formed into the floor 12. When the DSL 20 is installed and then operated by someone in the room by pressing down on the top of the DSL 20, the latch pins 20A are positioned down into the floor strike 32 thereby locking the door 10 closed.

Figure 5:
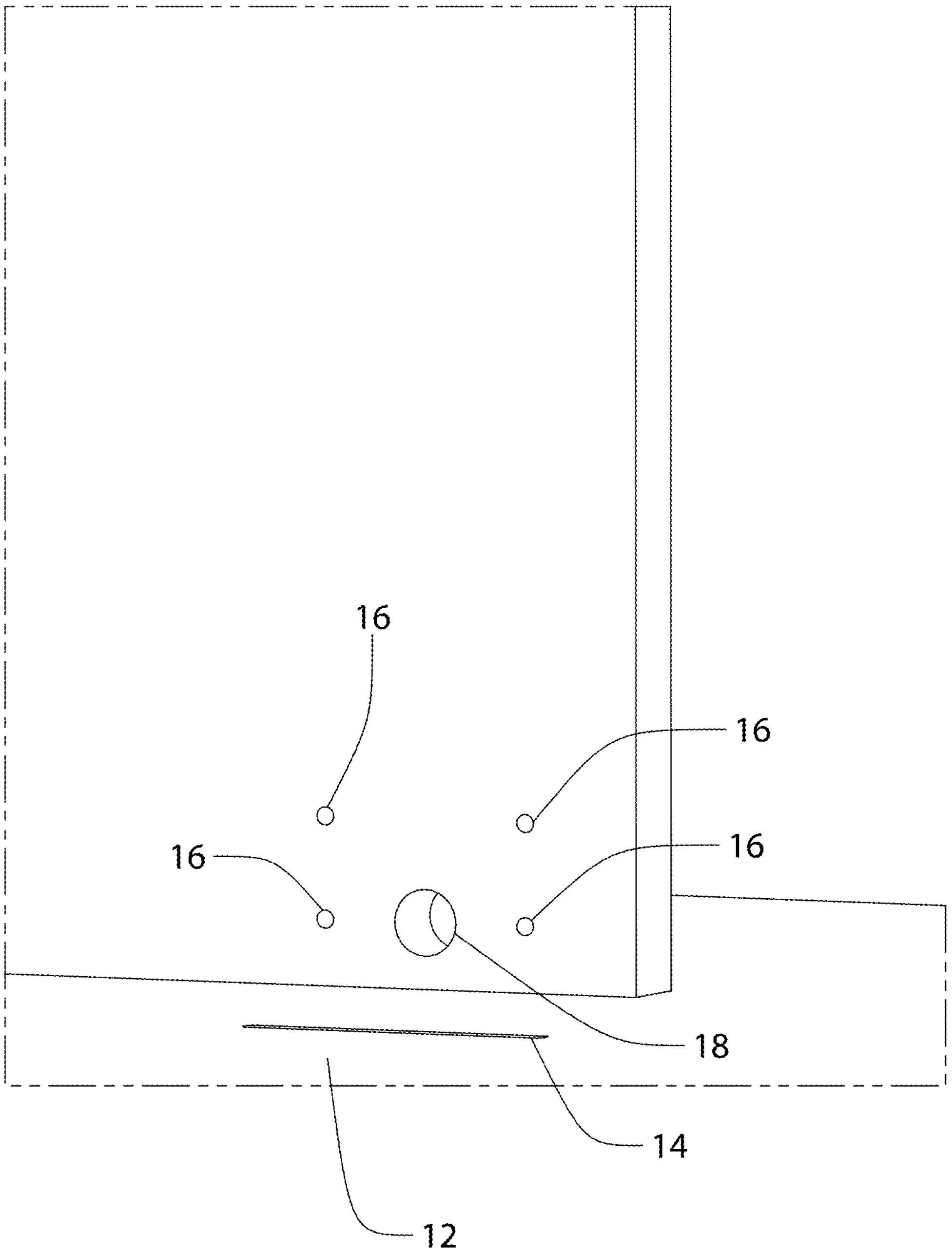
FIG. 5 depicts the holes drilled into the door, and the floor strike, using the specialized tool of the present invention.

Thus, in view of the foregoing, as one can appreciate, mounting the inner door plate 26, outer door plate 24 (as well as the overall door assembly 22 onto the door 10 at the proper location, as well as forming the floor strike 32 in the precise location in the floor 12) is critical to making the DSL 20 work properly. Not only that, but many doors 10 are skewed in their installation. Arriving at what is shown in FIG. 5, namely, the proper location of the stud 30 holes, the key/lock cylinder hole 18 and the relative position of the well 14 in the floor 12 to receive the floor strike 32 therein, must be precise and must account for skewing of the door 10 installation, as mentioned previously.

In view of the foregoing, there are no installation tools that simultaneously and mechanically align the location of the DSL mounting brackets 24/26 with the location of the DSL floor strike 32, ensuring consistent and precise positioning for the DSL 20 to engage properly with the floor strike 32. So that is where the door assembly and floor strike installation tools of the present invention come in. They allow for the installers to precisely locate the mounting holes 16 (see FIG. 5) in the door 10 for the door assembly 22, the hole 18 for the key/lock cylinder 28 and for forming the well 14 for the floor strike 32 in the precise location in the floor 12 without the need to take manual measurements, thereby slowing down the installation time of the door assembly 22 and the floor strike 32, and thereby avoiding mistakenly locating the door assembly mounting holes 16 and key/lock cylinder hole 18 in the door 10 or forming the floor strike 32 improperly.

Installation of Door Assembly 22

Figure 9A:
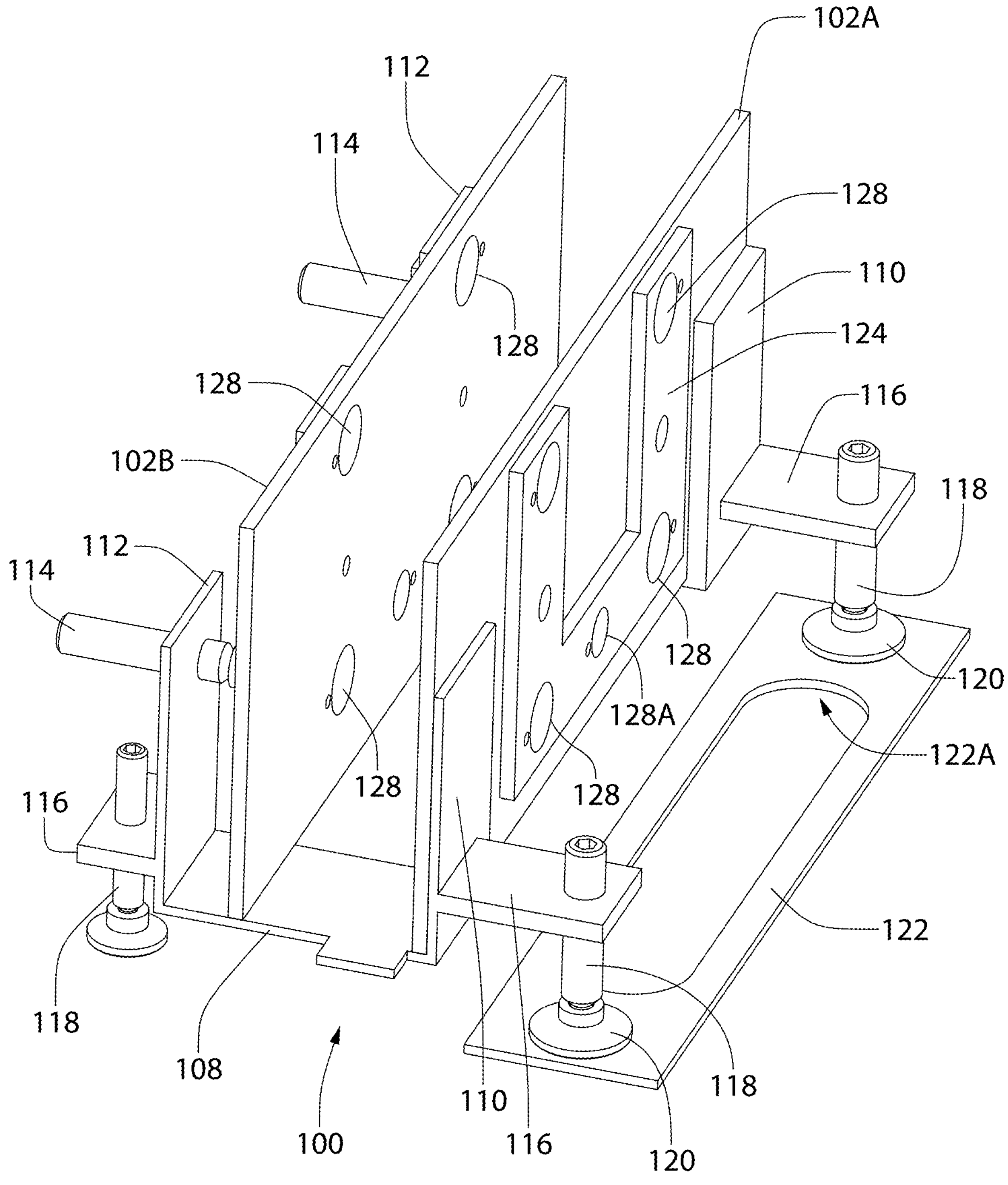
FIG. 9A is an isometric view of the first jig of the present invention showing a first side thereof, Jig 1 being the assembly for marking the door with the proper holes to mount the door hardware, as well as defining the location of the floor strike on the floor.
Figure 9B:
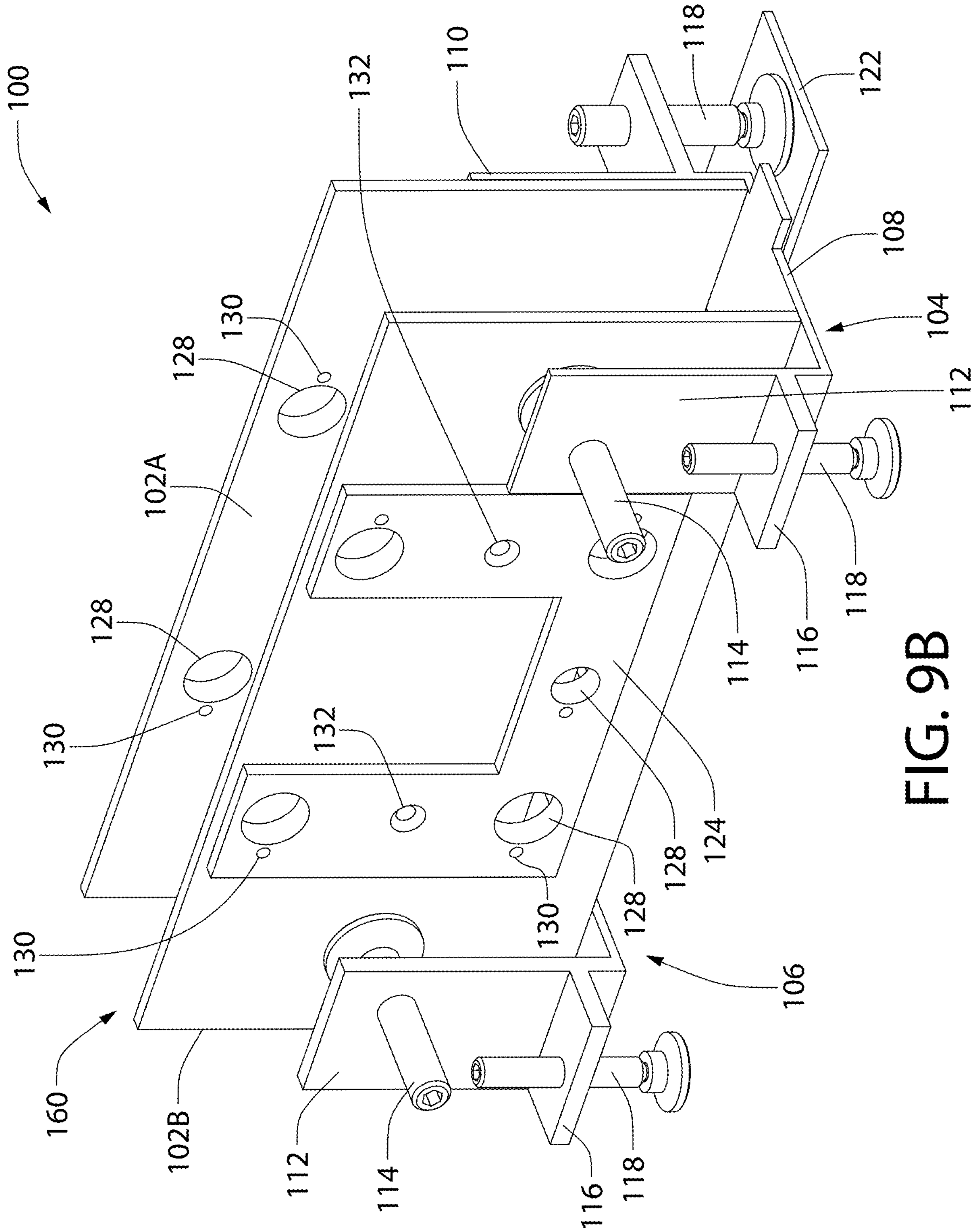
FIG. 9B is an isometric view of the first jig of the present invention of FIG. 9A showing a second side thereof.
Figure 9C:
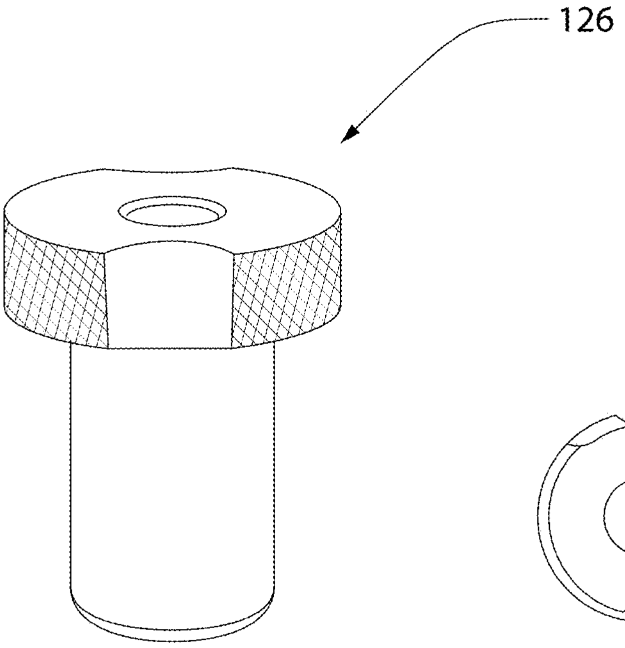
FIG. 9C is an isometric view of an exemplary bushing used in the first jig for making precise holes in the door.

As will be discussed in detail below, forming the precise locations for the holes 16/18 in the door 10 (for mounting the door assembly 22 thereto) and forming the well 14 (to receive the floor strike 32 therein) at the precise location in the floor 12 are accomplished using two devices, a first installation tool or "first jig" 100 (FJ, FIGS. 9A-9B) and a second installation tool or "second jig" 200 (SJ, FIGS. 10A-10D).

FJ 100 is used to generate the mounting holes 16 in the door 10 for the door assembly 22, for key/lock cylinder hole 18 and for marking the floor 12, precisely where the well 14 for the floor strike 32 is to be formed. Once the installer completes the use of Jig 1, it can be removed and the door assembly 22 is installed. Next, SJ 200 is brought into proximity with the inside surface of the door 10 in order to form the well 14 within the floor 12 for the floor strike 32. SJ 200 is a more complex device than FJ 100 since SJ 200 requires the application of a vertically-mounted drill located above an adjustable precision assembly (APA).

It should be noted that, as will be discussed in detail below, FJ 100 has adjustable feet for engaging FJ 100 with the floor 12 and, as such, FJ 100 can be moved slightly aside to allow the placement of SJ 200 at the door but the FJ 100 can be re-engaged with the door 10 to minimize vibration of the door 10 while SJ 200 is operating.

First Jig (FJ) 100

As mentioned, the first step for installing the door assembly 22 is to use FJ 100 to locate the mounting holes 16 and the key/lock cylinder hole 18 on the door 10 while also defining the precise location of the well 14 in the floor 12 for the floor strike 32. To accomplish that, FJ 100 comprises two aperture templates, namely, an outer door template 102A and an inner door template 102B. As can be seen most clearly in FIG. 8A, the outer door template 102B is adjustable with respect to the inner door plate 102A to accommodate for different door 10 thicknesses. The vertically-upstanding templates 102A/102B have opposite sides residing on U-shaped braces 104 and 106 (FIG. 9B); although not shown, the door 10 is positioned in between these templates 102A/102B with the bottom of the door 10 resting on the cross member 108 of each brace 104/106. The outer door template 102A is fixedly secured to a first portion 110 of the U-shaped braces 104/106. The second portion 112 of each brace 104/106 accommodates an adjustment member 114 (e.g., screw with thrust pad such the GN638 stainless steel grub screw with stainless steel thrust pad by JW Winco) for displacing the inner door template 102B with respect to the outer door template 102A; the adjustment members 114 are fixedly-secured to the inner door template 102B (e.g., welded or fastened; pads 114A can be welded and/or fastened to the inner door template 102B). To adjust the height of the FJ 100, wings 116 are provided on the first and second portions 110/112 to accommodate a vertical adjustment member 118 (e.g., screw with thrust pad, mentioned previously). The vertical adjustment members 118 on the side of the outer door template 102A are fixedly-secured (via, contact pads 120) to a floor strike template 122 that rests on the floor 12. It should be noted that position on the wings 116 to which the vertical adjustment members 118 are mounted thereon position the floor strike template 122 at the precise location where the well 14 will be formed for the floor strike 32. This floor strike template 122 acts as an indicator, precisely resting on the location where the well 14 for the floor strike 32 will be formed. As can be seen most clearly in FIG. 9A, the floor strike template 122 comprises an oval-shaped aperture 122A that identifies the location of the floor strike 32. Thus, FJ 100 simultaneously and mechanically locates the mounting holes of the DSL mounting plate 26 at the same time it identifies the location of the floor strike 32. Thus, FJ 100 assures that once the well 14 is formed by SJ 200 and the floor strike 32 inserted therein, and once the mounting plate 26 is secured to the door 10 and the DSL 20 inserted therein and activated, the latch pins 20A will accurately enter into the floor strike 32 to lock the door 10. Furthermore, with FJ 100 secured to the door 10, the operator can use a knife or other cutting tool to run along the edge of the oval-shaped aperture 122A to remove the overlying carpet, linoleum, vinyl tiles, tiles, etc. to expose the underlying floor structure, e.g., concrete, etc., into which the well 14 will be formed. In addition, the operator can then run a marker along the edge of the oval-shaped aperture 122A to mark the floor structure to be cut using the SJ 200.

Figure 9D:
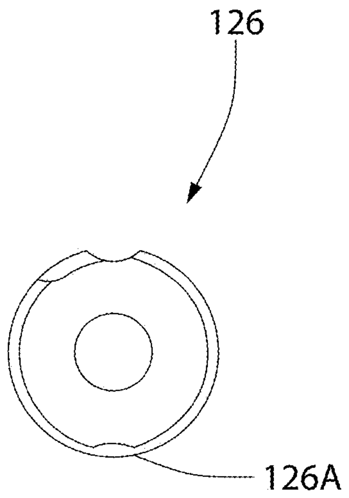
FIG. 9D is a top view of the exemplary bushing showing where a lock screw is positioned to stabilize the bushing during use.

Each template 102A/102B has a U-shaped member 124 on the outside surface with a plurality of apertures. The U-shaped member 124 provides an additional thickness to each template 102A/102B to provide a sufficient support surface for bushings 126 that are inserted into the plurality of apertures 128. These bushings 126, when inserted into the plurality of apertures 128, provide precise guidance of a drill bit when forming the mounting holes 16 and the key/lock cylinder hole 18. Next to each aperture 128, there is a small aperture 130; these apertures 130 are provided to receive a lock screw (not shown) therein which stabilizes the bushing 126 in its corresponding aperture 128 during drilling. FIG. 9D indicates at 126A where the lock screw would be located when it is tightened into the corresponding aperture 130.

If the operator wishes to further stabilize the inner and outer door templates 102A/102B to the door 10 while using the FJ 100, two additional apertures 132 are provided in the templates 102A/102B to receive fasteners (not shown, e.g., screws). Once the mounting holes 16, key and lock cylinder hole 18 are formed in the door 10, the fasteners can be removed from the additional apertures 132.

Once all of the holes 16/18 are formed, the FJ 100 can be completely removed from the door 10. Alternatively, FJ 100 can be used to stabilize the door 10 (e.g., from vibrating, etc.) when the SJ 200 is engaged with the door 10. In particular, once all of the holes in the door 10 are formed, the FJ 100 can be disengaged from the door 10 and then slid toward the hinge side of the door 10 and then re-engaged to the door 10. The FJ 10 can thus stabilize the door 10 from vibration/movement while the SJ 200 is operating because the height adjustment members 118 and the template adjustment members 114 can be releasably secured to the door 10 at the FJ 100's new position.

Although there are a wide variety of adjustment members that can be used for the template adjustment members 114 and the height adjustment members 118, by way of example only, the adjustment member 114/118 can be activated by inserting a tool (e.g., an Allen key) into the free end of the adjustment members 114/118. Furthermore, it should be understood that it is within the broadest scope of the present invention whereby adjustment of the distance between the two templates 102A/102B, as well as releasably securing the FJ 100 to the door 100, is achieved with a single adjustment member, rather two of them 114. Similarly, it is within the broadest scope of the present invention whereby adjustment of the height of FJ 100 may be accomplished via the use of a single adjustment member rather than four of them 118.

Second Jig (SJ) 200

As can be seen in FIGS. 10A-10I, SJ 200 basically comprises the vertically-mounted drill 202 (e.g., a 15 amp Weka cord drill, etc.) having a hole-drilling bit 202A (FIGS. 12A-12B, e.g., a Premium Wet Core Bit) coupled thereto, all of which is vertically adjustable and is horizontally adjustable in order to properly form the well 14 into which the floor strike 32 is to be inserted. A coupling assembly 204 is provided on the working side of SJ 200 to permit SJ 200 to be coupled to the door 10 properly, while allowing for any slight misalignment of the door 10. Transport wheels 206A/206B are provided to permit the SJ 200 to be easily transported from one location to the next; they do not contribute the formation of the floor strike 32.

Figure 10A:
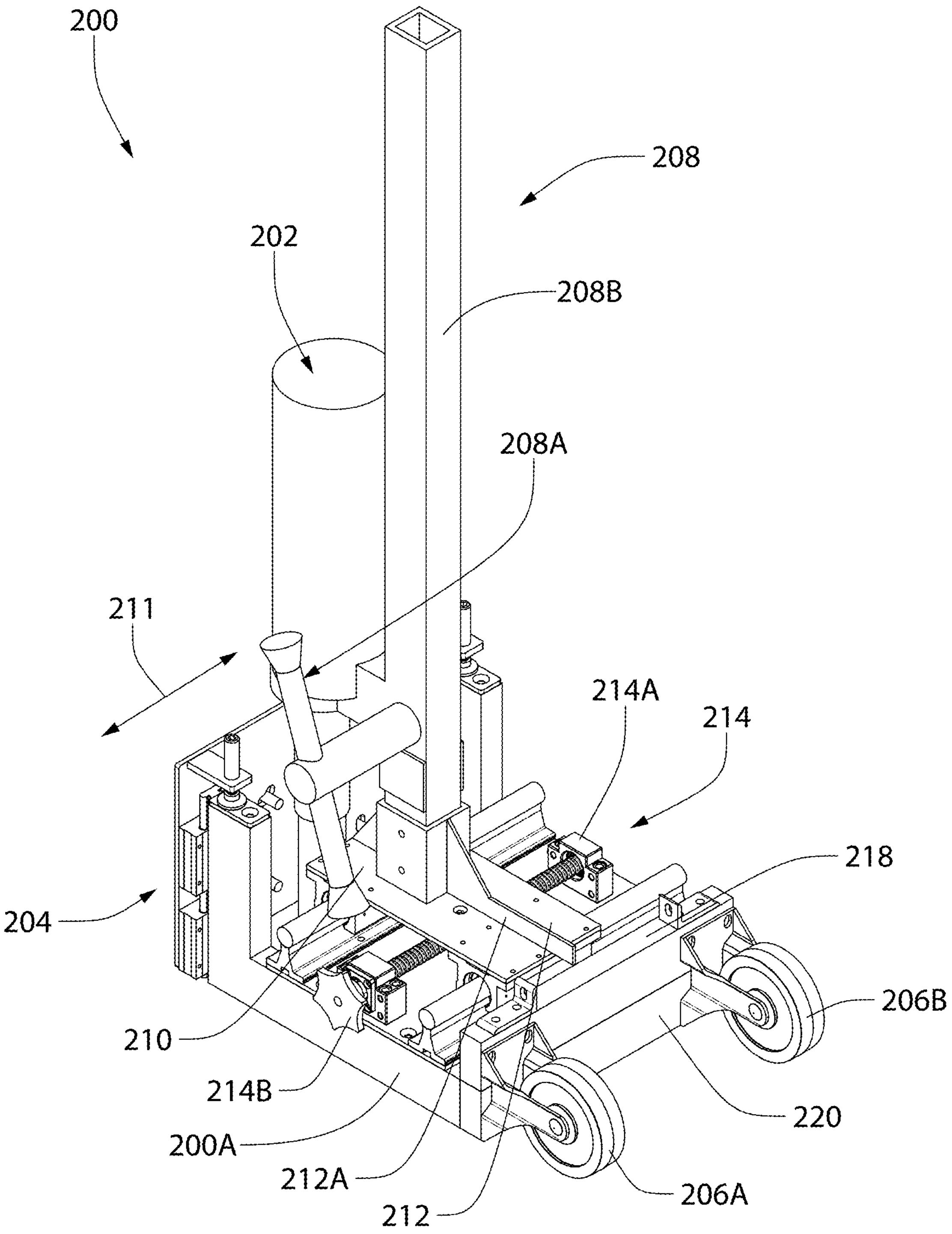
FIG. 10A is an isometric view of the second jig of the installation tool that forms the floor strike in the floor.
Figure 10B:
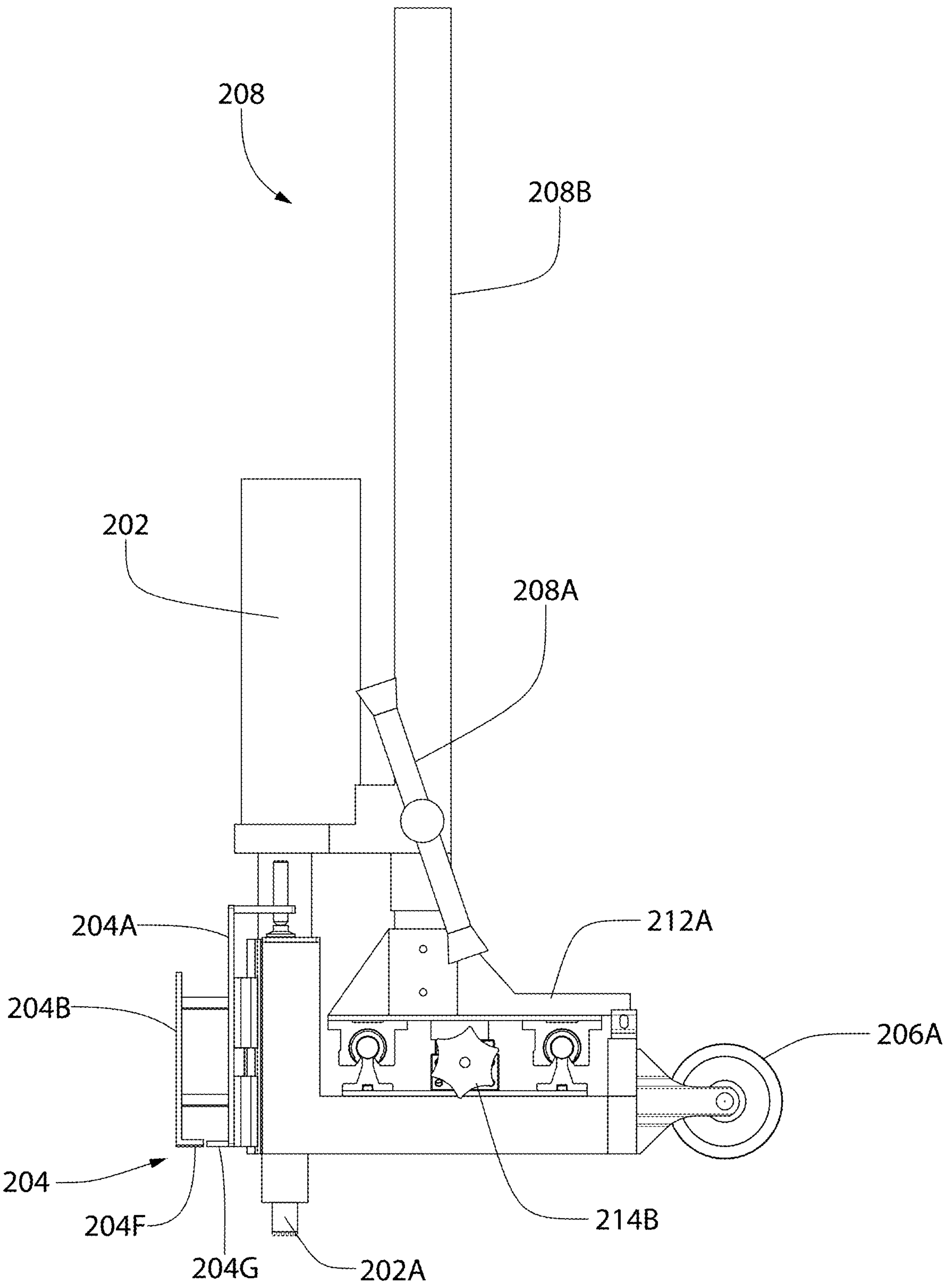
FIG. 10B is a side view of the installation tool of FIG. 10A.
Figure 10C:
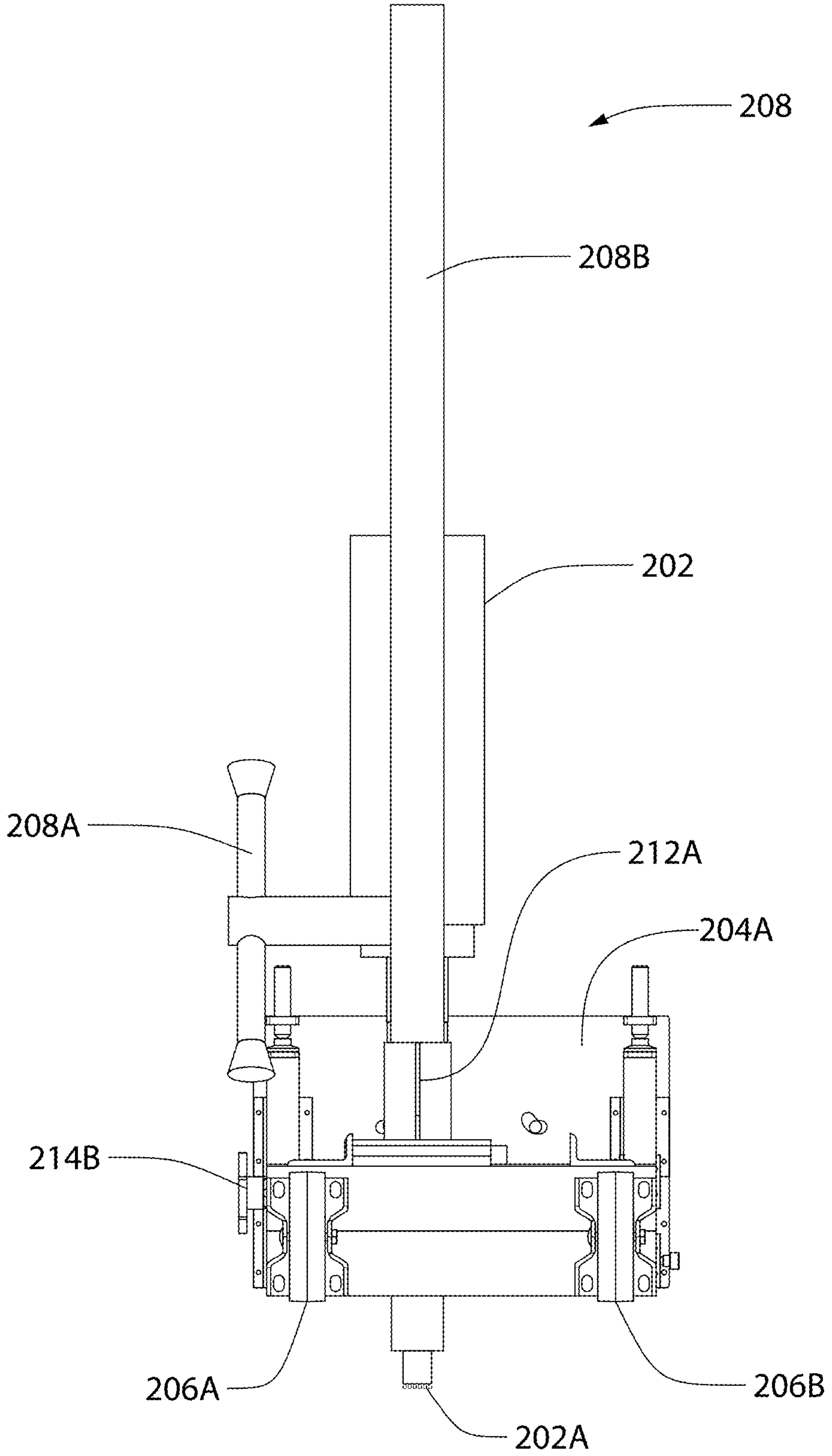
FIG. 10C is a back view of the installation tool of FIG. 10A.
Figure 10D:
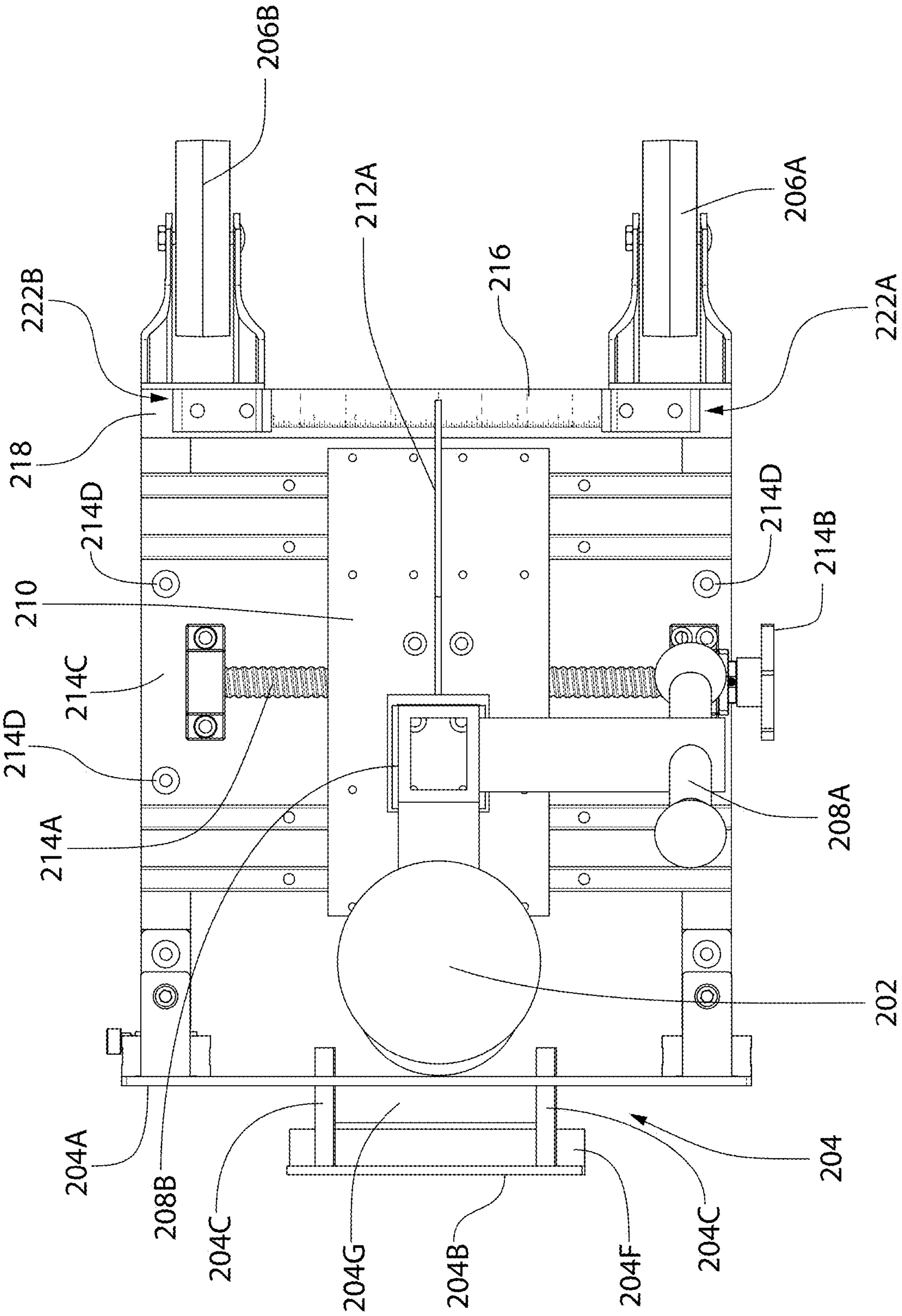
FIG. 10D is a top view of the installation tool of FIG. 10A.

As can be seen most clearly in FIG. 10A, the drill 202 is mounted to a vertical control assembly 208 which may comprise a rack and pinion for moving the drill 202 up and down. The vertical control assembly 208 is secured to a mobile base 210 which can move in an x-direction 211, as will be discussed below. The mobile base 210 moves with respect to a second jig frame 200A that rests on the floor. A control handle 208A allows the operator to raise or lower the drill 202 during operation. In addition, the base 210 comprises a strut 212 that is perpendicular to the x-direction 211, as will also be discussed below. By way of example only, a M-4 Core Rig by Diamond Products can be utilized for the vertical control assembly 208.

The mobile base 210, as mentioned previously, is movable in the x-direction 211 which is a direction that is parallel to the door's surface, when the SJ 200 is releasably secured to the door 10, as will also be discussed below. An adjustable precision assembly (APA) 214 is provided to permit precise placement of the drill 202 along the x-direction 208. The APA 214 may comprise a lead screw linear actuator 214A (e.g., PBC Linear Actuator) that is manually controlled by the operator using a star knob 214B (FIG. 10A).

Figure 13:
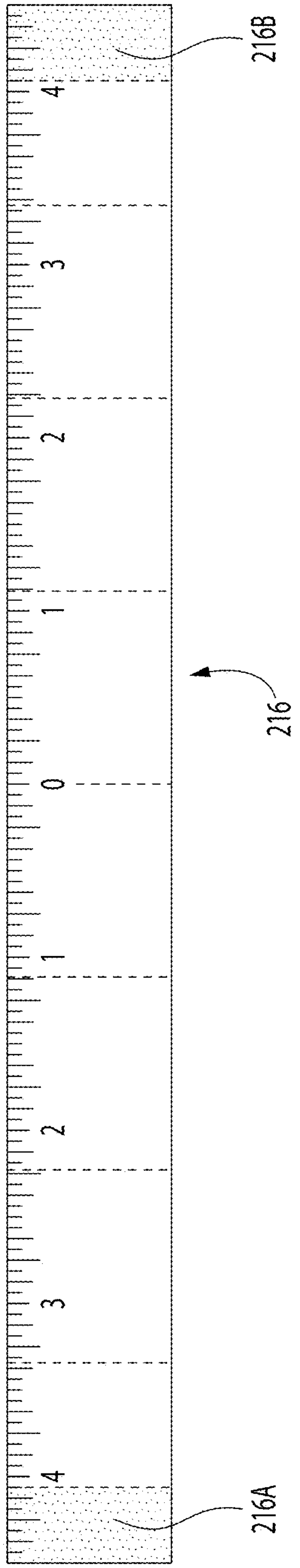
FIG. 13 depicts an exemplary scale.
Figure 14:
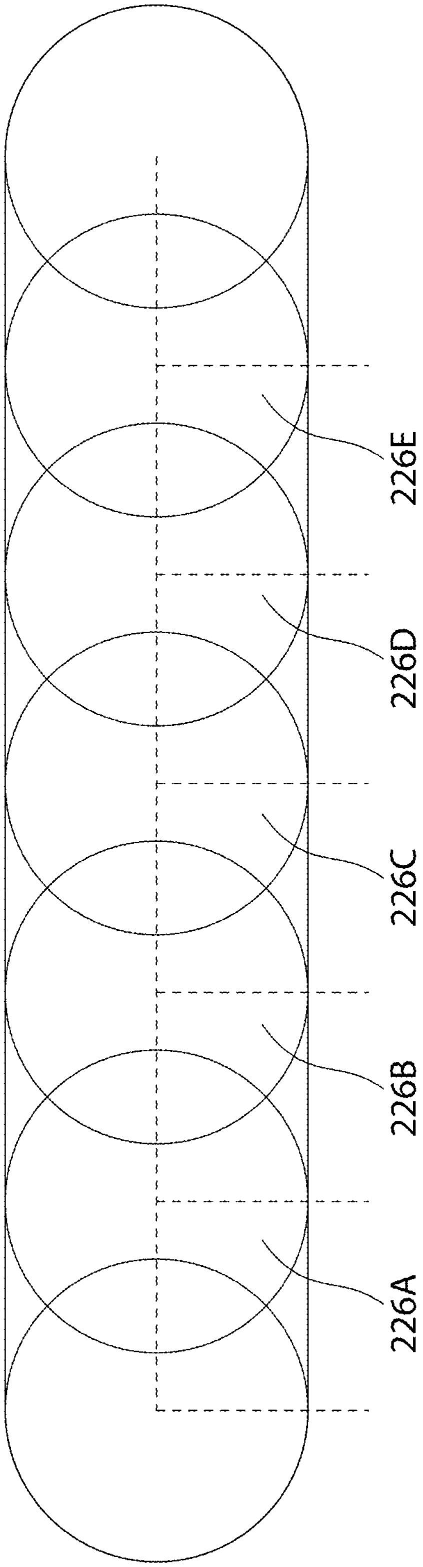
FIG. 14 is a diagram of the hole pattern to be drilled in the floor by second jig to form the well for the floor strike.

As mentioned previously, the horizontal adjustment of the drill 202 is manually-driven using the star knob 214A. Precisely locating the drill bit is achieved by monitoring a scale 216 (FIG. 13) that is affixed to rear of the frame 200A top edge 218 of the wheel shade 220. On either sides of the top edge 218 of the wheel shade 220 are two stops 222A and 222B. The scale 216 is affixed to the top edge 218 precisely before the stops 222A/222B are secured to the top surface 218. The upright members 222A1/222B1 of the stops 224A and 224B are affixed on the top surface 222A such that their inner surfaces are aligned with the inside edges 216A/216B of the scale 220 end portions. As such, when the star knob 214B is rotated by the operator, the strut 212 is limited in motion in either direction by these stops 222A/222B. Furthermore, the strut 222 comprises an upright flange 222A that is centered with the drill 202; thus, when the operator activates the APA 214, the upright flange 222A rides over the scale 216, indicating the precise location of the drill 202 based on the scale 216 markings. The operator can precisely control the location of the drill bit by aligning the upright flange 212A with predetermined locations on the scale 216. As shown in the scale 216 (FIG. 13), the "0" mark indicates the center of a center hole 226C (FIG. 14) to be drilled in the floor 12, as discussed further below.

Figure 10E:
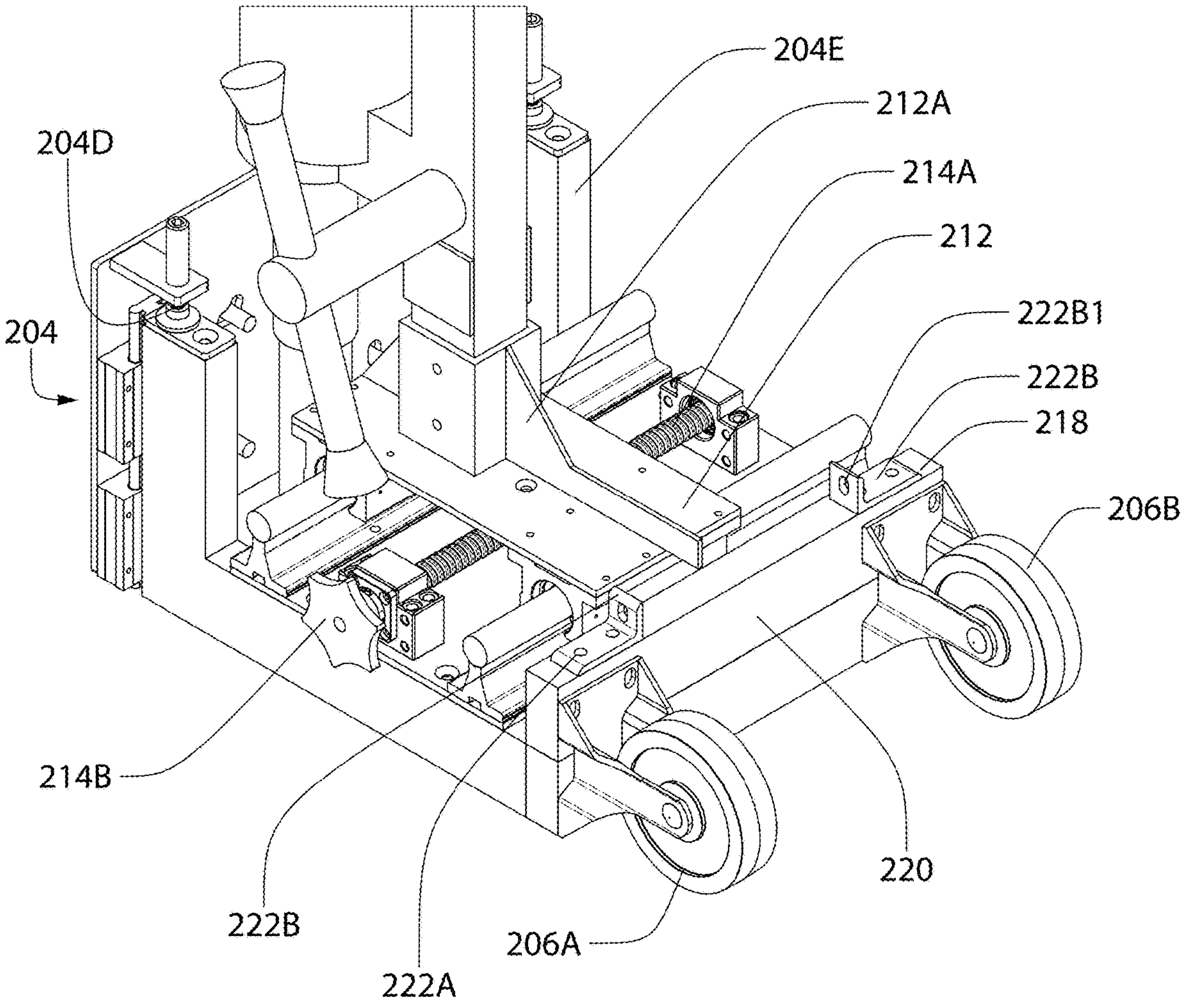
FIG. 10E is a partial isometric view of the second jig showing the adjustable precision assembly (APA) of the present invention showing and the wheel shade and location of a scale for precisely positioning the drill in the x-direction.
Figure 10F:
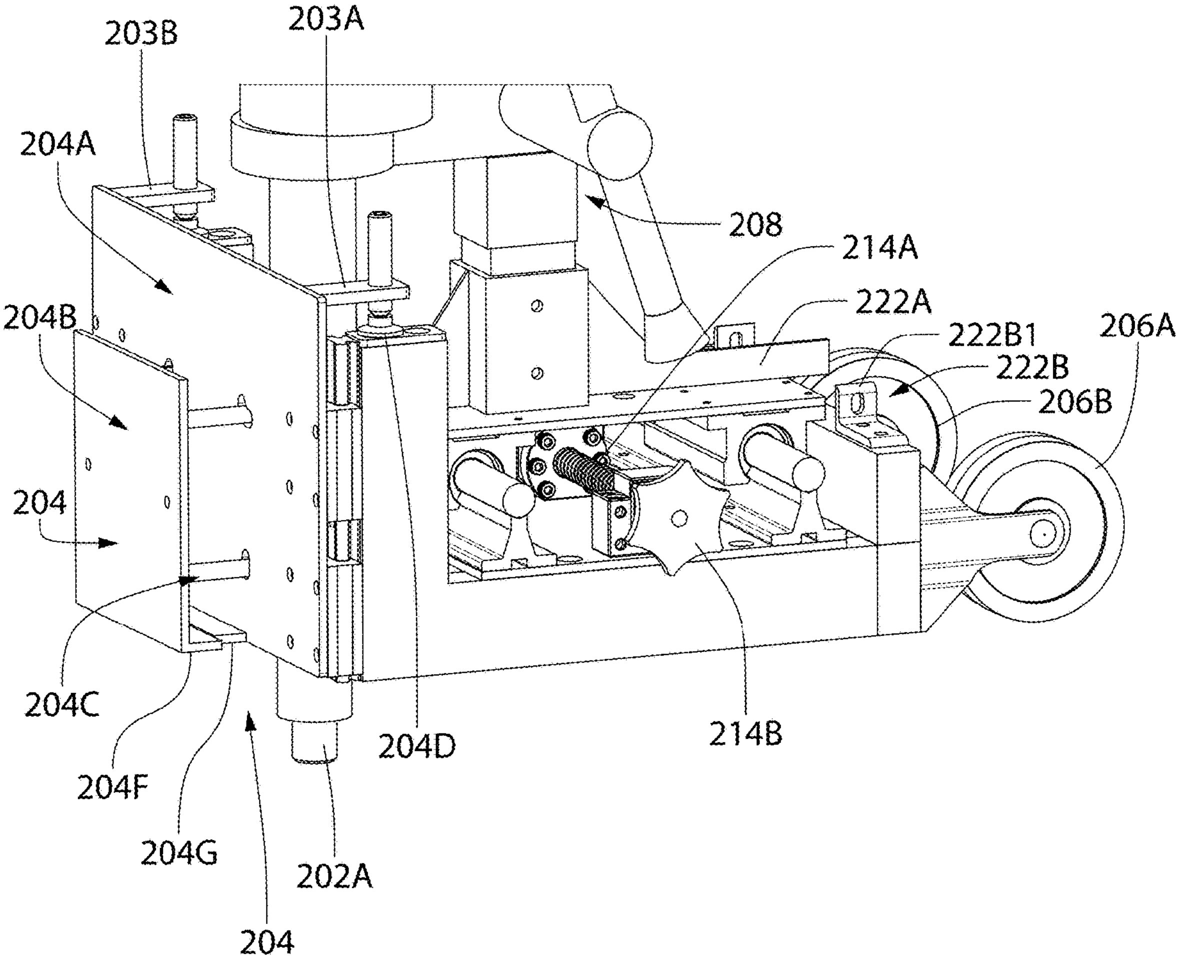
FIG. 10F is a partial isometric view of the second jig showing the coupling assembly.
Figure 10G:
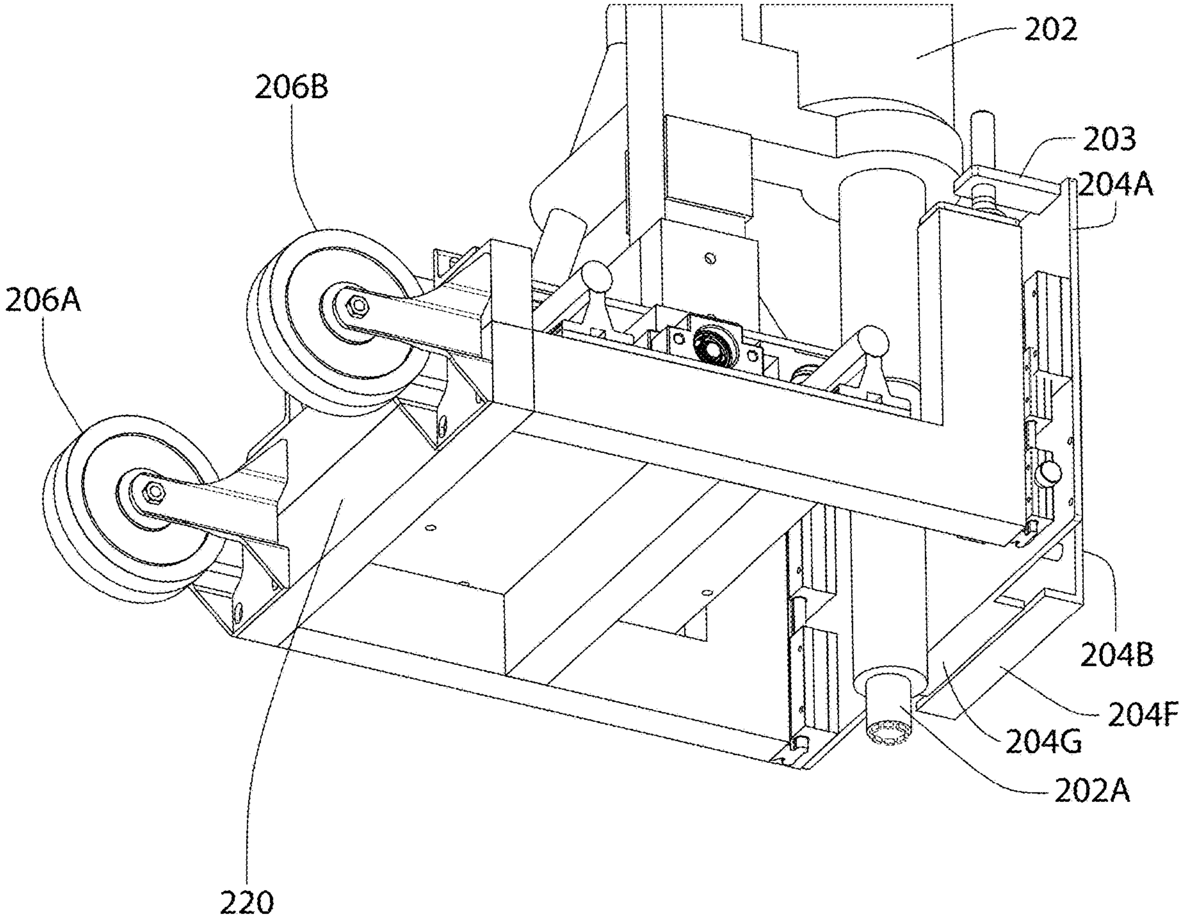
FIG. 10G is bottom partial isometric view of the second jig.
Figure 10H:
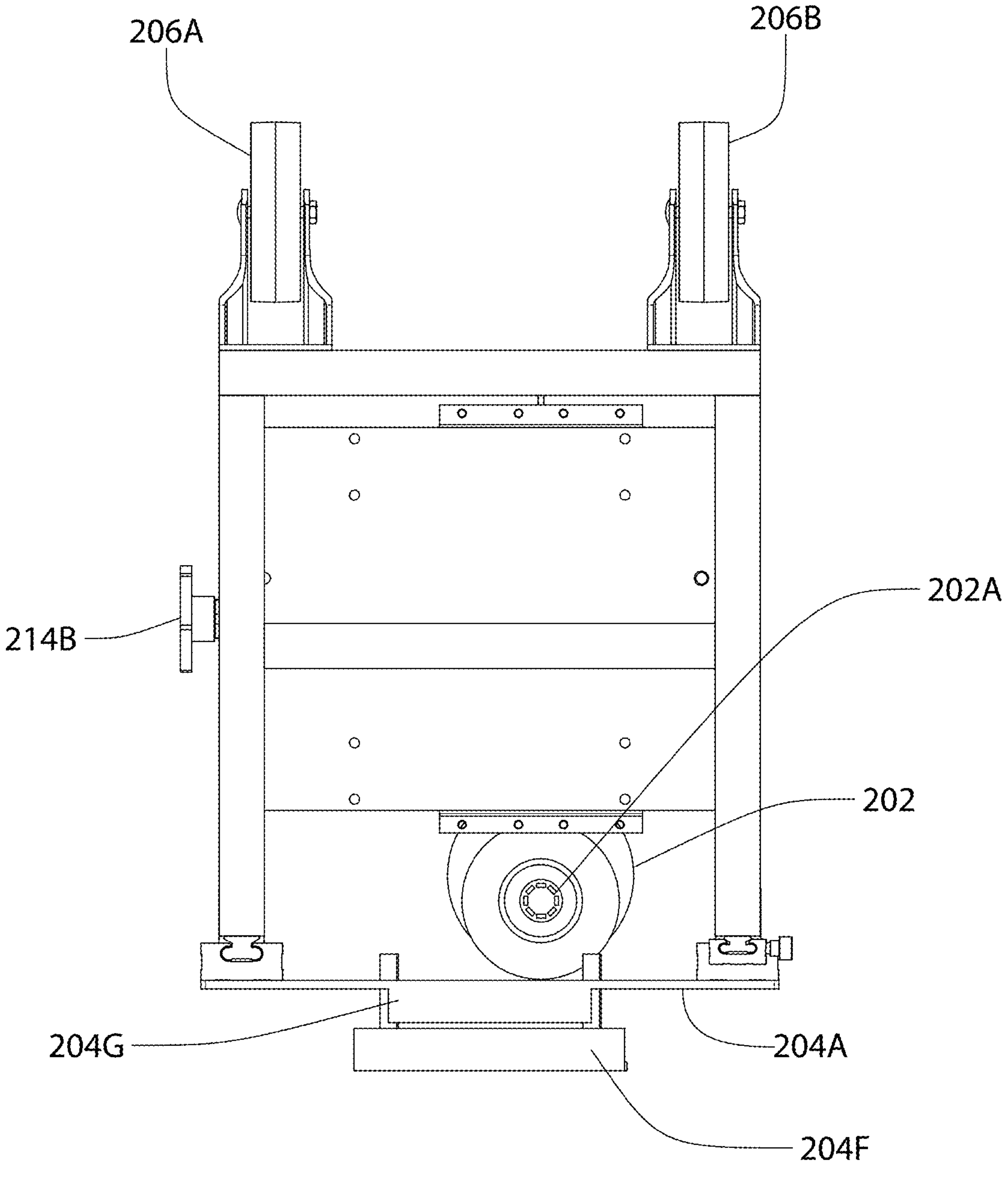
FIG. 10H is a bottom plan view of the second jig.
Figure 10I:
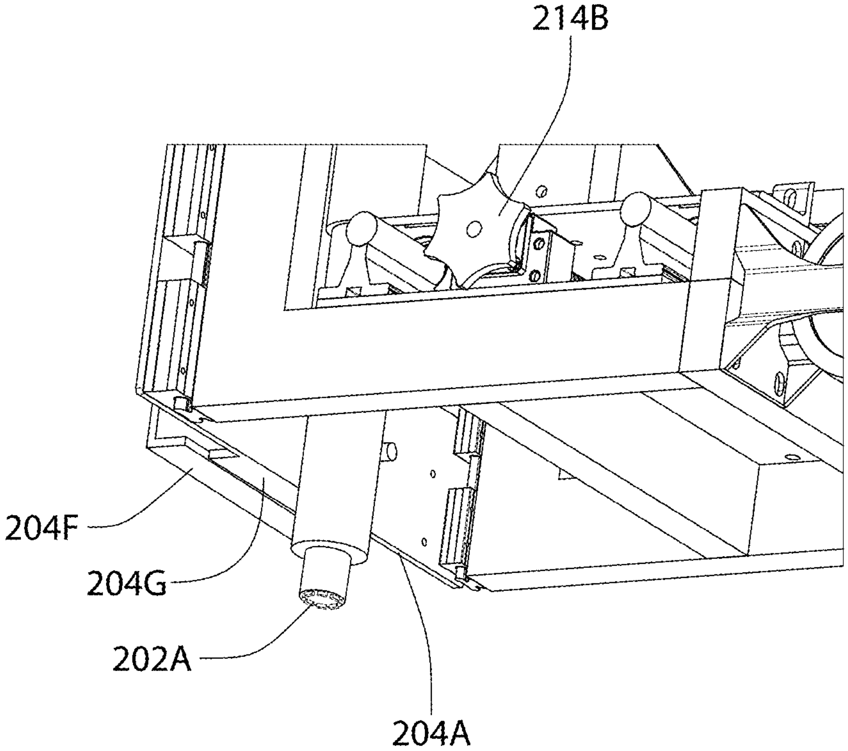
FIG. 10I is enlarged partial isometric view of the drill bit attached to the drill on the second jig.

SJ 200 has to be precisely placed against the door 10 before the drill 202 is activated. To accomplish that, the coupling assembly 204 is used. As shown most clearly in FIG. 10F, the coupling assembly 204 comprises a front plate 204A, an adjustable back plate 204B, threaded rods 204C perpendicularly affixed to one face of the back plate 204B, and a pair of manually-adjustable vertical actuators 204D and 204E (FIG. 10E). The number of threaded rods 204C correspond to the number of apertures 16 previously formed in the door 10 using the FJ 100.

To couple the SJ 200 to the door 10, the back plate 204B is positioned on the inside surface of the door 10 and the threaded rods 204C are passed through the apertures 16 the door 10 so that they protrude outward from the outside surface of the door 10. The top of front plate 204A has attachment arms 203A/203B that are releasably secured to respective tops of the manually-adjustable vertical actuators 204D and 204E (e.g., MR Mini Rail Mr20-0150-1 Linear Rail). These vertical actuators 204D/204E are independently adjusted by the operator to align the front plate 204A with the threaded rods 204C; for example, an Allen key can be engaged with the top of the actuators 204D/204E in opposite directions to either raise or lower the corresponding side of the front plate 204A. A bottom flange 204F (FIGS. 10G-10I) is present on the bottom of the back plate 204B to make a tight fit to the door 10 bottom.

It should be understood that that the position of the APA 214 on the frame 200A is important in the SJ 200 because that location determines how far the drill 202 is positioned from the door 10 when the drill 202 is activated to form the well 14 in the floor 12 and into which the floor strike 32 will then be positioned. Recall that the position of the latch pins 20A of the DSL 20, when the DSL 20 is installed in the inner door plate 26, determines the required position of the floor strike 32, such that when the DSL 20 is activated, the latch pins 20A will pass downward and into the floor strike 32. Thus, as shown most clearly in FIG. 10D, the APA 214 is mounted on a frame plate 214C that is precisely secured to the frame 200A by fasteners (not shown) secured in the apertures 214D.

Figure 11A:
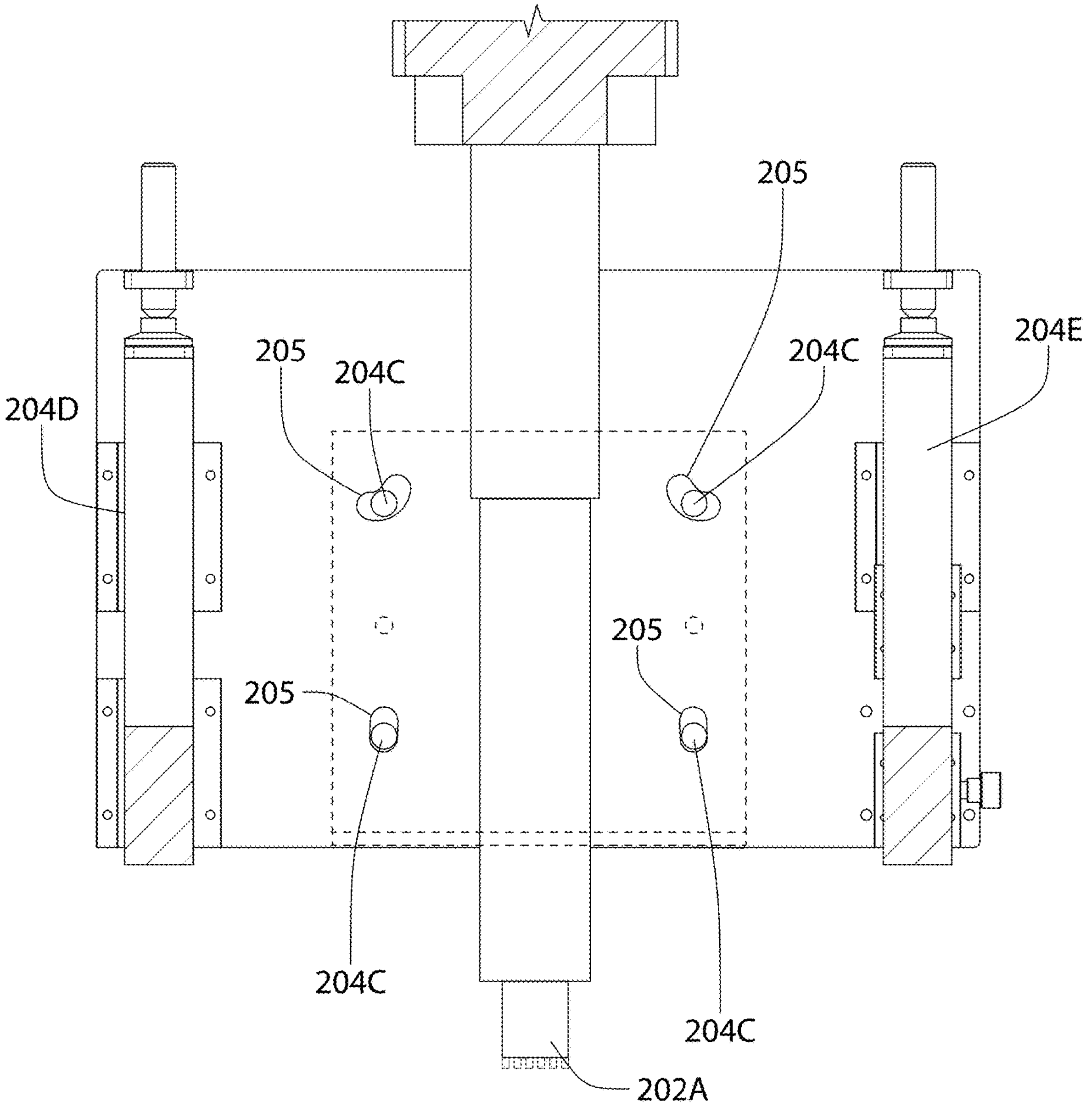
FIG. 11A depicts the front plate with the threaded rods of the back plate protruding therethrough (the door is not shown)
Figure 11B:
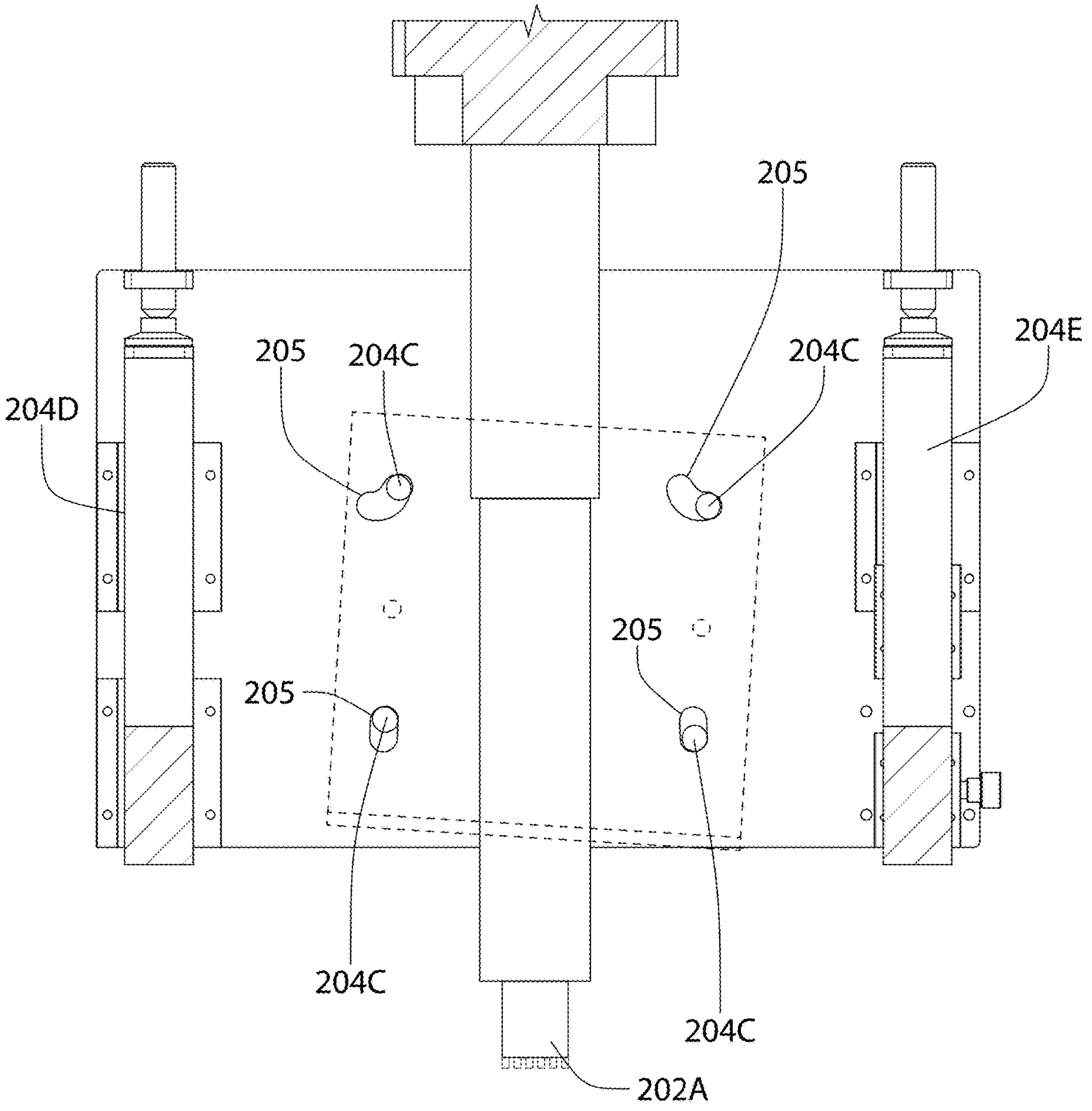
FIG. 11B depicts how the apertures in the front plate compensate for a skewed door at an angle of 3.25° with respect to the floor.
Figure 11C:
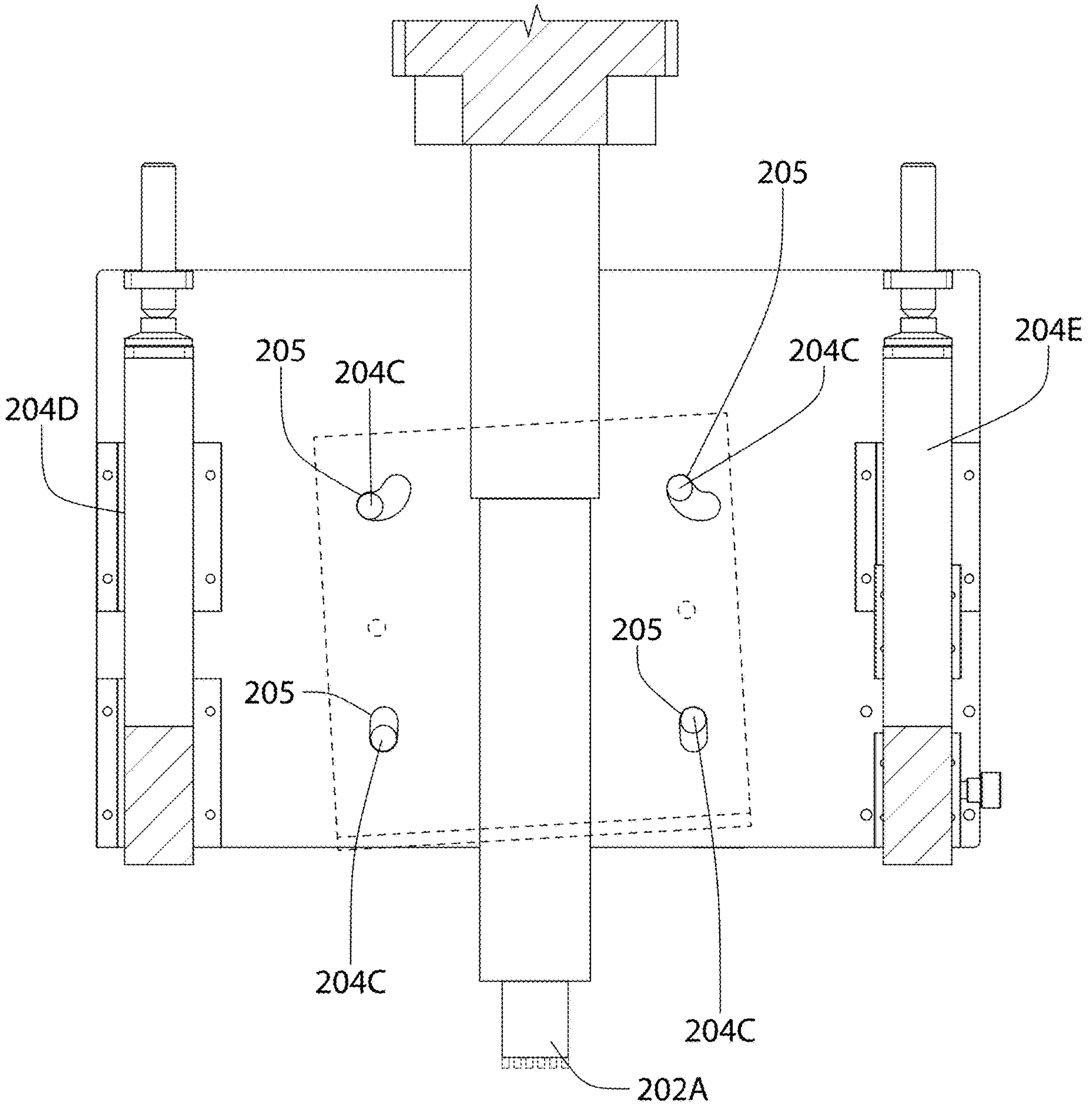
FIG. 11C depicts how the apertures in the front plate compensate for a skewed door at an angle of −3.25° with respect to the floor, and opposite to the skew shown in FIG. 10I.
Figure 11D:
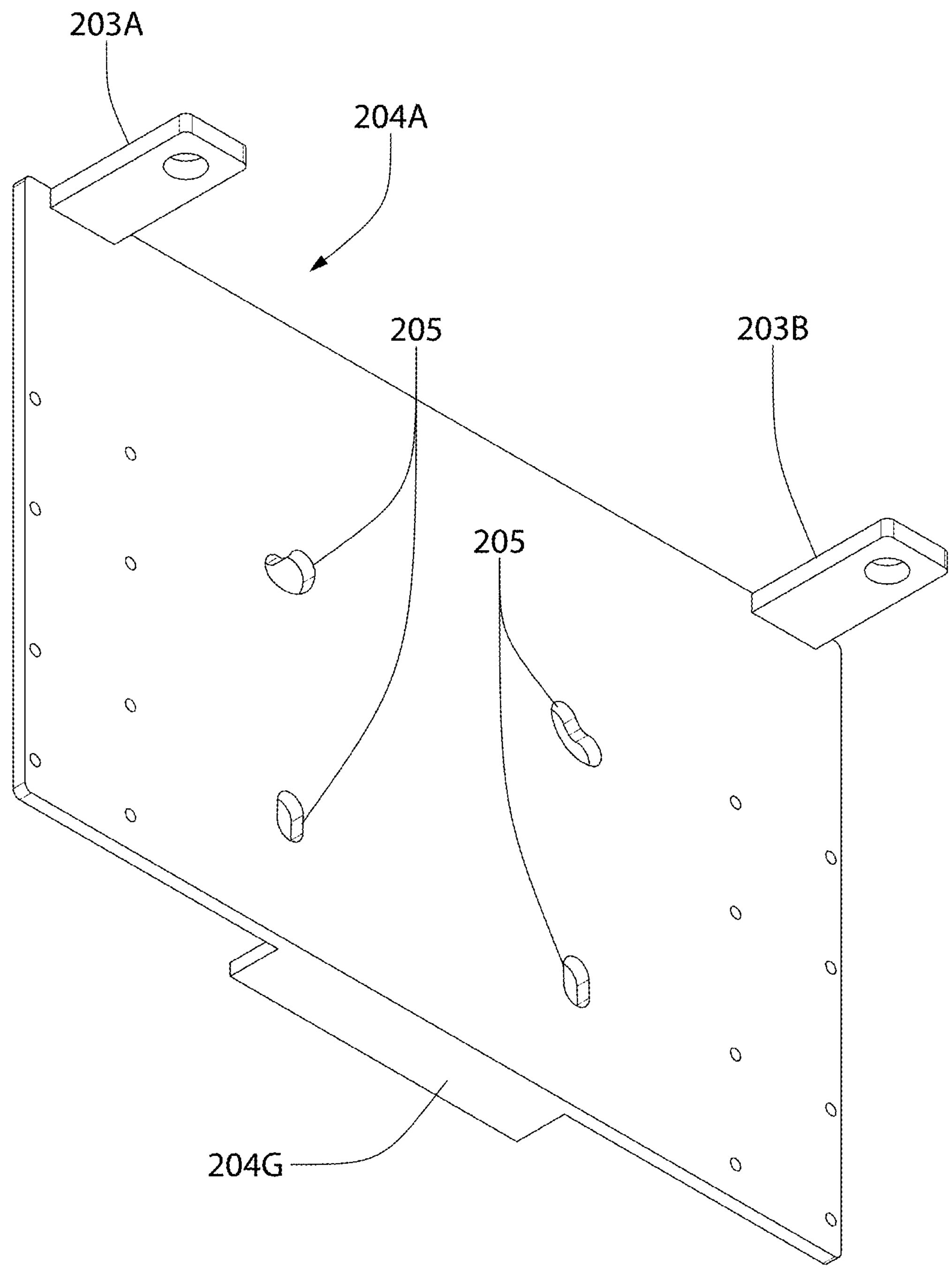
FIG. 11D is an isometric view of the front plate.
Figure 11F:
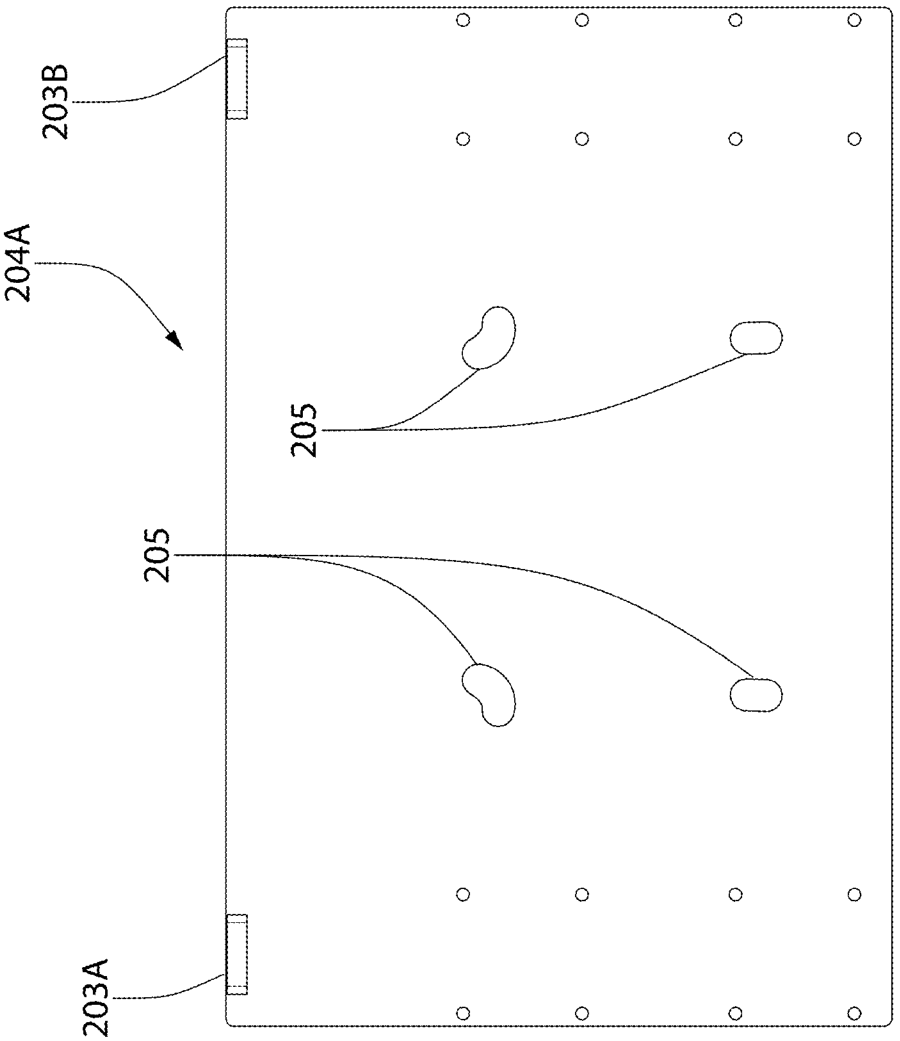
FIG. 11F is a plan view of the front plate that on the drill side of second jig.
Figure 11E:
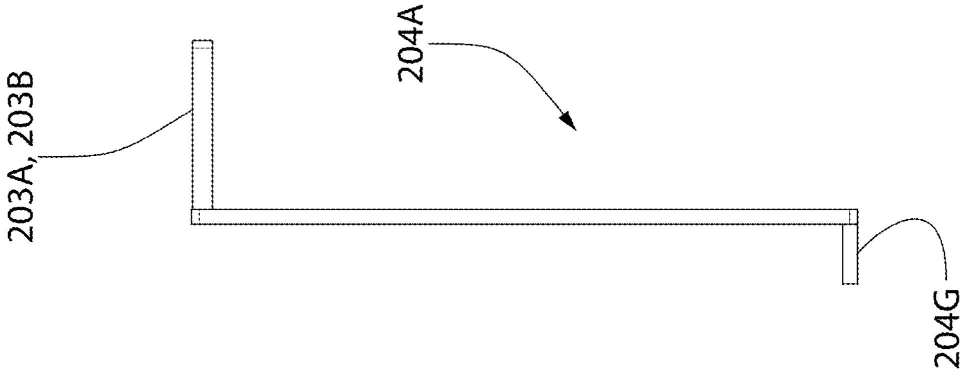
FIG. 11E is a side view of the front plate.
Figure 11G:
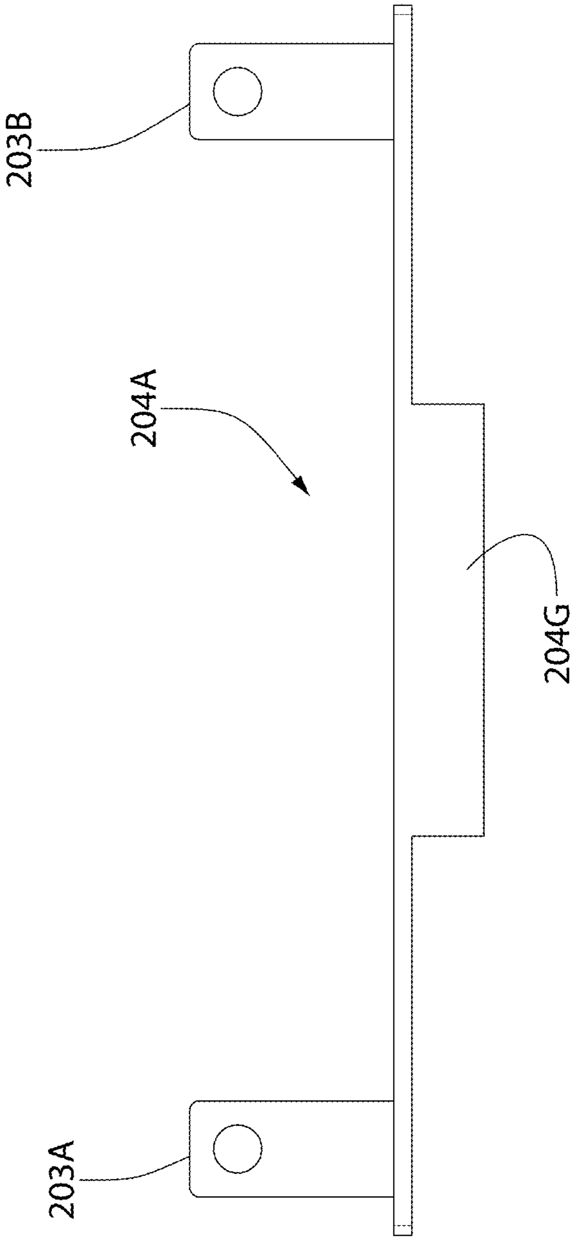
FIG. 11G is a bottom view of the front plate.

The SJ 200 is then moved into close proximity with the outside surface of the door 10 so that the front plate 204A is pressed up against the outside surface of the door 10 (not shown). As shown most clearly in FIG. 11A, the front plate 204A has a plurality of apertures 205 (e.g., four) corresponding to the number of threaded rods 204C from the back plate 204B. The lower two apertures 205 are oval-shaped and vertically-oriented. The upper two apertures 205 have a “curved jellybean” shape. All of these apertures are larger than the diameter of the threaded rods 204C to allow for adjustment if the door 10 is askew or angled with respect to the floor 12. This compensation is shown in FIGS. 11B-11C where the two extremes of a skewed door 10 are depicted. FIG. 11B depicts the front plate 204A attached to a door 10 (not shown) with a 3.25° angle of tilt in a first direction while FIG. 11C depicts the front plate 204A attached to a door 10 (not shown) with a −3.25° angle of tilt in a second opposite direction. FIG. 11D provides exemplary dimensions for the face plate 204A. The face plate 204A also includes a bottom flange 204G (FIGS. 10G-10I) to make a tight fit to the bottom of the door 10.

With the threaded rods 204C protruding through the front plate 204A, nuts (not shown) can engage on the protruding ends of the threaded rods 204C and tightened to releasably secure the SJ 200 to the door 10.

FIGS. 11D-11G provide further view of the face plate 204A.

Figure 12A:
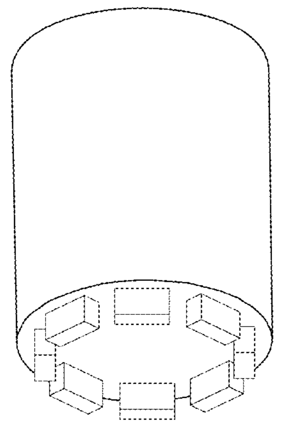
FIG. 12A is a side view of the drill bit for use on the drill of the second jig.
Figure 12B:
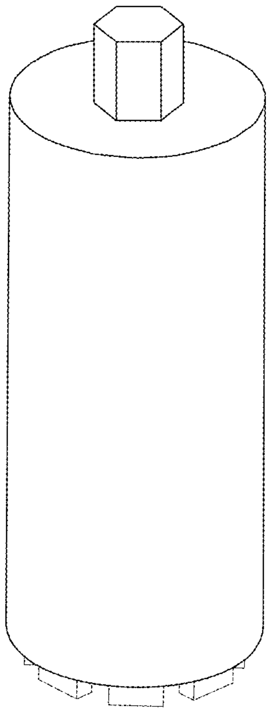
FIG. 12B is a partial view of the working end of the drill bit of FIG. 12A.

Formation of the well 14 is accomplished by drilling a series of overlapping holes into the floor 12. This process is also referred to as “coring” whereby cylindrical holes are drilled into the floor structure (e.g., concrete, etc.) typically using a diamond-tipped drill to extract a “core” of material to form the well in the floor. This coring method allows for cutting holes in the floor structure without causing significant damage to the surrounding area. FIG. 11 depicts the hole pattern to be formed by the drill 202. By way of example only, five overlapping holes 226A-226E are drilled to form the well 14, with hole 226C forming the center hole. As mentioned earlier, a particular drilling bit, namely, a hole-drilling bit 202A, is used to form the holes 226A-226E in the floor 12. As can be seen in FIGS. 12A-12B, radial teeth 201 around the circumference of the working end of the bit 202A function to cut into the floor material to form the holes 226-226E. In addition, although not shown, a lumen having an opening coincident with the working end of the bit is coupled to a vacuum source. Thus, during operation, cut pieces of the floor can be suctioned up through the lumen and out to a disposal.

Once the well 14 is formed, the floor strike 32 is then inserted and then secured therein.

In summary, the goal FJ 100 and SJ 200 is to install floor strikes 32 into floors 12 (e.g., concrete, carpet, linoleum, vinyl tiles, tiles, etc.; but, as also mentioned earlier, any carpet, linoleum, vinyl tiles, tiles, etc., must be removed from the area where the floor strike 32 is to be located). The floor strike 32 must be flush with the floor 12 and parallel with the door 10. The installation tools need to be easy to transport. The center of the floor strike is a maximum of 5.5 inches from the edge of the door. SJ 200 must be flush with the edge of the door 10 for at least 7 inches. Doors can be: left-hand doors, right-hand doors, left-hand reverse bevel and right-hand reverse bevel. Moreover, the bottom of doors 10 can be 0.5 inches-1.5 inches above the floor 12.

A diamond bit is used in the drill when forming the floor strike. The diamond bit is used to drill through cement or other hard flooring materials when forming the floor strike.

Although not shown in the figures, SJ 200 may also include the following features to further stabilize the jig during operation: adding suction cups that releasably secure to the door and adding adjustable feet to the portion of the floor rests that go under the door.

REFERENCE NUMBERS

10 door
12 floor
14 hole in floor to receive floor strike
16 holes in door for standoffs
18 hole in door for cam and key mechanism
20 Door Shelter Lock (DSL)
20A latch pins
22 door assembly
24 outer door plate
26 inner door plate or mounting plate
26A apertures in inner door plate for securing studs 30
26B aperture for key/lock cylinder 28
28 key/lock cylinder
28A cylinder ring
28B key faceplate and insertion aperture
28C cam
30 studs to connect inner door plate with outer door plate
32 floor strike
100 Jig 1 (FJ)
102A outer door template
102B inner door template
104 first U-shaped brace
106 second U-shaped brace
108 cross-member in each brace
110 first portion of braces 104/106
112 second portion of braces 104/106
114 template adjustment member
114A pads on adjustment member
116 wings
118 height adjustment member
120 contact pads
122 floor strike template
122A oval-shaped aperture in floor strike template
124 U-shaped member on each template
126 bushing
126A location of lock screw
128 apertures in templates
130 small apertures in templates for lock screws
132 additional apertures for stabilizing FJ 100 against the door
200 Second Jig (SJ)
200A frame of second jig
202 vertically-mounted drill
202A drill bit
202B drill bit teeth
203A left attachment arm
203B right attachment arm
204 coupling assembly
204A front plate

204B back plate
204C threaded rods
204D left manually-adjustable vertical actuator
204E right manually-adjustable vertical actuator
204F bottom flange on back plate to fit against door bottom
204G bottom flange on front plate to fit against door bottom
205 apertures in front plate
206A left transport wheel
206B right transport wheel
208 vertical control assembly (rack & pinion)
208A control handle
208B mast
210 mobile base
211 x-direction
212 strut on mobile base
214 adjustable precision assembly (APA)
214A lead screw linear actuator
214B star knob
214C APA frame plate
214D apertures for fasteners for APA base plate
216 scale
218 top edge of wheel shade
220 wheel shade
222A left stop
222B right stop
222A1 upright of left stop
222B1 upright of right stop While the invention has been described in detail and with reference to specific examples thereof, it will be apparent to one skilled in the art that various changes and modifications can be made therein without departing from the spirit and scope thereof.

What is claimed is:

1. A method for precisely defining the locations of a door lock mounting bracket on a door and a corresponding floor strike in a floor and the installation of the same such that a door lock mounted in the bracket consistently and precisely engages the floor strike, said method comprises:

(a) releasably securing a first installation tool to the door that simultaneously and mechanically aligns locations of mounting apertures in the door lock mounting bracket with a location on the floor for forming a well to receive said floor strike therein;

(b) forming a plurality of apertures in the door, corresponding to said mounting apertures, using said first installation tool which comprises a pair of plates that couple to an outer door surface and an inner door surface, respectively, each plate comprising said plurality of apertures;

(c) using said first installation tool to define the precise location of the well on the floor;

(d) disengaging said first installation tool from the door;

(e) releasably securing a second installation tool to the door using said plurality of apertures in the door, said second installation tool having a vertically-mounted drill that, when said second installation tool is releasably secured to the door, is fixedly positioned at a precise distance from the door corresponding to the location of the floor strike, said vertically-mounted drill being displaceable along a horizontal axis parallel to the door, said drill also being vertically-displaceable;

(f) activating said drill and lowering said drill such that a drill bit drills down into the floor to form a portion of the well;

(g) raising said drill and incrementally displacing said drill along said axis;

(h) repeating steps (f)-(g) until the well is formed within the floor; and (i) disengaging said second installation tool.

2. The method of claim 1 wherein said second installation tool comprises a linear scale affixed to a portion of said second installation tool that is oriented parallel to the inside surface of the door when said second installation tool is releasably coupled to the door, said linear scale defining increments.

3. The method of claim 2 wherein said drill is mounted to a base of said second installation tool that is manually adjustable along said axis.

4. The method of claim 3 wherein said step of incrementally displacing said drill along said axis comprises:

providing a pointer coupled to the drill that overlaps a portion of said linear scale; and indicating the increment by said pointer when said base is manually adjusted along said axis.

5. The method of claim 1 wherein said step of activating the drill comprises:

securing said drill bit to said drill, said drill bit comprising a cylindrical member with teeth formed on a circumference of a lower end of said cylindrical member; and placing said drill bit into contact with the floor to core out material in the floor structure.

6. The method of claim 1 wherein said first installation tool comprises a plurality of vertically-adjustable members configured for resting on the floor and wherein said step (d) is replaced with the following step (d1):

(d1) uncoupling said first installation tool from the door, sliding said first installation tool towards a hinge side of the door and then releasably securing said first installation tool to the door to stabilize the door when said second installation tool, having said drill that is vertically and horizontally displaceable, is releasably coupled to the door and activated.

7. The method of claim 1 wherein said step of using said first installation tool to define the location of the well comprises providing a floor strike template fixed to said first installation tool that overlays the location of the well, said floor strike template comprising a planar member with oval-shaped aperture therein.

8. The method of claim 7 wherein step of using said first installation tool to define the location of the well comprises running a cutting tool around an edge of said oval-shaped aperture to remove a covering overlaying the floor.

9. The method of claim 8 wherein said covering comprises one from the group of carpeting, linoleum, and tiling.

10. The method of claim 7 wherein step of using said first installation tool to define the location of the well comprises running a marker around an edge of said aperture to precisely mark the location of a well in the floor for receiving said floor strike therein.

* * * * *